(12) United States Patent
Awano et al.

(10) Patent No.: US 6,657,927 B1
(45) Date of Patent: Dec. 2, 2003

(54) OPTICAL HEAD AND APPARATUS PROVIDED THEREWITH

(75) Inventors: Hiroyuki Awano, Noda (JP); Hitoshi Watanabe, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/366,548

(22) Filed: Aug. 4, 1999

(30) Foreign Application Priority Data

Aug. 4, 1998 (JP) ............................................ 10-220261

(51) Int. Cl.[7] ................................................ G11B 11/00
(52) U.S. Cl. .................................. 369/13.23; 369/13.32; 369/300
(58) Field of Search .......................... 369/13.23, 13.54, 369/13.32, 44.21, 300, 13.22, 13.17, 13.02, 13.24, 44.14, 44.12, 40.23, 44.11; 385/33; 250/201.5

(56) References Cited

U.S. PATENT DOCUMENTS

| | | | | |
|---|---|---|---|---|
| 5,124,961 A | * | 6/1992 | Yamaguchi et al. | ........ 369/300 |
| 5,199,090 A | * | 3/1993 | Bell | ............................. 385/33 |
| 5,327,417 A | * | 7/1994 | Tanaka et al. | .............. 369/219 |
| 5,995,474 A | * | 11/1999 | Shimano et al. | ............ 369/112 |
| 6,130,863 A | * | 10/2000 | Wang et al. | .................. 369/13 |
| 6,184,512 B1 | * | 2/2001 | Higashiura et al. | ...... 250/201.5 |
| 6,243,350 B1 | * | 6/2001 | Knight et al. | ................ 369/126 |
| 6,307,818 B1 | * | 10/2001 | Jerman et al. | ................ 369/13 |
| 6,404,723 B1 | * | 6/2002 | Morishita | .............. 369/112.23 |

FOREIGN PATENT DOCUMENTS

| | | |
|---|---|---|
| JP | A-6-251410 | 9/1994 |
| WO | WO98/02877 | 1/1998 |
| WO | WO98/02878 | 1/1998 |

OTHER PUBLICATIONS

Hirano, Toshiki et al., "Invar Mems Milliactuator for Hard Disk Drive Application," *IEEE*, 1997, 0–7803–3744–1/97, pp. 378–379.

(List continued on next page.)

*Primary Examiner*—Ali Neyzari
(74) *Attorney, Agent, or Firm*—Oliff & Berridge, PLC

(57) ABSTRACT

An optical head comprises a laser light source, detectors, a reflecting mirror, a magnetic coil, and a driving circuit which are formed in a monolithic manner on a surface of a substrate. A diffraction grating is formed on the reflecting mirror. A reflected light beam can be divided into those directed to the detectors. Optical paths from the reflecting mirror to the respective detectors are disposed in directions along the substrate. Accordingly, the thickness of the optical head can be made thin. The substrate can be also processed into a slider. The optical head is capable of high speed access and high speed data transfer, in which a miniaturized size and a light weight are realized.

34 Claims, 17 Drawing Sheets

OTHER PUBLICATIONS

Shin, Jong–Woo et al., "Design and Fabrication of Micromirror Array Supported by Vertical Springs," *Sensors and Actuators,* A 66 (1998) 144–149.

Chung, Seok–Whan et al., Measurements of a Fabricated Micro Mirror Using a Lateral–Effect Position–Sensitive Photodiode, *IEEE Transactions on Industrial Electronics,* vol. 45, No. 6, Dec. 1998.

Imamura, Takahiro et al., "Transverse Mode Electrostatic Microactuator for Mems–Based HDD Slider" File Memory Laboratory, FUJITSU LIMITED, *IEEE,* 1996, 0–7803–2985–6/96.

Koganezawa, S. et al., "A Flexural Piggyback Milli–Actuator for Over 5 Gbit/in.$^2$ Density Magnetic Recording" File Memory Laboratory, Fujitsu Limited, *IEEE,* 1966.

Knight, Gordon, "Beyond the Superparamagnetic Limit I: Near Field Recording," *Data Storage,* Feb., 1998.

Davis, Joseph, "Beyond the Superparamagnetic Limit II: Far–Field Recording," *Data Storage,* Feb., 1998.

Yonezawa, Minoru, et al "Electrostatic Torsion Mirror for Optical Disk Drives," Proceedings of Magneto–Optical Recording International Symposium '99,*J. Magn. Soc. Jpn.,* vol. 23, Supplement, No. S1 (1999), pp. 241–244 © 1999 by The Magnetics Society of Japan.

* cited by examiner

OPTICAL HEAD AND APPARATUS PROVIDED THEREWITH

BACKGROUND OF THE INVENTION

1. Field of the Invention

The present invention relates to a floating optical head which is preferably used for high density recording. In particular, the present invention relates to a microminiature floating optical head and a microminiature floating magneto-optical head which are monolithically provided with a light source, a detector, and an optical system on a substrate. The present invention also relates to an apparatus which is provided with such an optical head or such a magneto-optical head for recording or reproducing information.

2. Description of the Related Art

The recording density of the optical disk is restricted by the spot diameter of the light source. The spot diameter of the light source is represented, for example, by $\lambda/NA$ provided that the numerical aperture of the objective lens to be used is NA (usually about 0.5) and the wavelength is $\lambda$. The spot diameter is about 1.2 $\mu$m when the wavelength is 680 nm and NA is 0.55. Therefore, it is necessary to reduce the spot diameter in order to improve the recording density. According to the expression described above, when it is intended to reduce the light spot diameter, it is convenient that the NA of the objective lens is increased, or the wavelength is shortened. For this purpose, a variety of approaches have been tried. When an objective lens having high NA is used, the focal distance is relatively short. Therefore, it is necessary to use the objective lens in a state in which it is fairly close to the optical recording medium. For this purpose, it has been suggested that a floating head as used for the magnetic disk is used for the magneto-optical recording medium.

However, in the case of the optical head for the magneto-optical recording medium, it is necessary that a large lens and a large mirror are provided on the floating head to introduce the light up to the disk. Therefore, a problem arises in that the floating head has a considerably heavy weight, and a long time is required for the floating head to make access to a predetermined recording or reproducing area. Further, when it is intended to arrange the floating heads for several sheets of disks as in the magnetic disks to perform recording and reproduction independently thereon, a drawback appears in that the volume of the apparatus is increased because the floating head is large.

For example, Japanese Patent Application Laid-Open No. 6-251410 discloses an optical head comprising a semiconductor laser and a photodetector formed on a substrate via a buffer layer, an opening formed under a laser beam-radiating surface and a receiving surface, a first glass layer charged in the opening, a grating formed on a lower surface of the first glass layer, a second glass layer formed under the first glass layer, and a grating lens having an aperture of not more than 1 mm formed on a lower surface of the second glass layer. The optical head can be produced in a monolithic manner by using the semiconductor process such as a photomask exposure process. The optical head is characterized in that the surface light emission laser and the photodiode can be simultaneously produced. Further, the optical head uses the grating. Therefore, the reflected light beam from the recording medium can be branched while allowing the incident light into the recording medium to be perpendicular to the surface thereof. Further, the optical head reduces the influence of the returning light beam of the reflected light beam directed to the laser light source.

However, the optical head disclosed in Japanese Patent Application Laid-Open No. 6-251410 uses the grating. Therefore, in order to make it possible to reliably detect the diffracted light beam from the grating by using the photodetector, it is necessary to ensure the thickness of the first glass layer, i.e., the predetermined distance from the photodetector to the grating. For this reason, the optical head involves a problem in that the volume of the apparatus is large.

Further, the conventional floating optical head, in which the head floats over the magneto-optical recording medium to perform recording and reproduction, is insufficient concerning the fact that a large magnetic field should be applied with good following performance to the information-recording medium which is irradiated with the recording or reproducing light beam. In order to respond to the further advancing progress of the magneto-optical recording medium to realize the high density in future, it is demanded to obtain a magneto-optical or magnetic head which makes it possible to apply a large magnetic field at a sufficiently high speed.

The present invention has been made in order to solve the problems involved in the conventional technique, an object of which is to provide a floating optical head which has a further miniaturized size, which has a light weight, and which makes it possible to accelerate the access speed to an information-recording medium thereby, and an apparatus provided with such an optical head which makes it possible to record or reproduce information on an information-recording medium.

Another object of the present invention is to provide a floating optical head which includes a laser light source and a detector and which is easily produced, and an apparatus including such a floating optical head.

Still another object of the present invention is to provide an optical head provided with a magnetic field-applying device which makes it possible to apply a large magnetic field at a high speed to a magneto-optical recording medium, and an apparatus including such an optical head.

SUMMARY OF THE INVENTION

According to a first aspect of the present invention, there is provided an optical head for being used for an optical apparatus for recording or reproducing information by radiating light onto an information-recording medium, the optical head comprising:

a laser light source for radiating a laser beam onto the information-recording medium;

a detector for detecting the laser beam reflected from the information-recording medium; and an optical guide unit for introducing, into the detector, the laser beam reflected from the information-recording medium, wherein:

the laser light source, the detector, and the optical guide unit are formed on a common substrate in a monolithic manner.

According to the optical head of the present invention, the laser light source, the detector, and the optical guide unit are formed on the common substrate in the monolithic manner. Therefore, it is possible to realize the head having a miniaturized size and a light weight. All of the elements of the head as described above can be formed on the substrate by means of the semiconductor process. Therefore, the head can be produced easily and correctly although it has an elaborate structure. The head includes the optical guide unit which is formed on the common substrate together with the detector. Accordingly, an optical path for the laser beam from the optical guide unit to the detector is formed on the substrate. Therefore, it is possible to ensure, within the substrate surface, the optical path length necessary to perform the tracking and the focusing servo. Thus, the thickness of the optical head can be made extremely thin. Therefore, when the optical head is accommodated in a slider, the slider itself can be made thin.

The optical head of the present invention may further comprise an objective lens for collecting the laser beam from the laser light source onto the information-recording medium, and a magnetic coil coated on the objective lens. The optical head may further comprise a yoke for the magnetic coil. Accordingly, the optical head functions as a magneto-optical head, and it is preferably used to perform recording and reproduction on a magneto-optical recording medium. Especially, the magneto-optical head can make access from one surface of the magneto-optical recording medium. Therefore, the recording can be performed on both surfaces of the magneto-optical recording medium. Accordingly, a recording or reproducing apparatus can be constructed as shown in FIG. 8.

The optical guide unit may include a first reflecting mirror and/or a prism for directing the laser beam reflected from the information-recording medium to a photodetector. The photodetector includes a plurality of detectors, and the first reflecting mirror has, on a surface of the first reflecting mirror, a diffraction grating for dividing the laser beam into those directed to the respective detectors. The light beams (for example, 0-order light beam, ±1-order light beams), which are diffracted by the diffraction grating, are directed to the respective detectors. The optical path from the diffraction grating to the detector is in the in-plane direction of the substrate. Therefore, the thickness of the head is not increased by the optical path, unlike the optical head disclosed in Japanese Patent Application Laid-Open No. 6-251410.

The optical guide unit may further comprise a second reflecting mirror for directing the laser beam from the laser light source to the information-recording medium. The first and second reflecting mirrors can be formed to have a triangular prism-shaped configuration in a monolithic manner. Thus, the optical system can be further simplified.

The optical guide unit may include a prism for directing the laser beam reflected from the information-recording medium to a photodetector, in place of or in addition to the diffraction grating. The prism is also formed on the substrate. Therefore, the optical path in the prism also exists in the substrate surface. This feature contributes to the realization of the thin head.

The optical head may further comprise a microactuator for adjusting a course of the laser beam to be radiated onto the information-recording medium. The microactuator can be used to vertically and horizontally move the laser spot to be radiated onto the information-recording medium. Accordingly, it is possible to perform the autofocus and the tracking servo by using the microactuator. Further, the optical head may further comprise a driving circuit for driving the magnetic coil in a monolithic manner on the substrate. Accordingly, all of the functions necessary for the operation of the optical head can be monolithically carried on the substrate.

According to a second aspect of the present invention, there is provided an apparatus for recording or reproducing information on an information-recording medium, which carries the optical head according to the first aspect. The apparatus is excellent in response performance, and it can perform the operation at a high speed, because the optical head has a miniaturized size, a light weight, and a thin type configuration. Therefore, the apparatus is preferably used to perform recording or reproduction on an information-recording medium subjected to high density recording, especially on a magneto-optical recording medium.

According to a third aspect of the present invention, there is provided an optical head for being used for an apparatus for recording or reproducing information by radiating light onto an information-recording medium, the optical head comprising:
  a laser light source for radiating a laser beam onto the information-recording medium;
  a detector for detecting the laser beam reflected from the information-recording medium;
  an optical guide unit for introducing, into the detector, the laser beam reflected from the information-recording medium; and
  a slider floatable over the information-recording medium, including a recess formed on a side of the slider opposing to the information-recording medium, wherein:
    the laser light source, the detector, and the optical guide unit are formed on a bottom of the recess of the slider in a monolithic manner.

The floating optical head according to this aspect comprises the slider which is processed and composed of a semiconductor substrate. Therefore, the laser light source, the detector, and the optical guide can be directly formed on the bottom surface of the recess of the slider. Accordingly, it is possible to provide the floating optical head which is precise and which is produced extremely easily. It is preferable to use sapphire as a material for the slider.

The optical head may comprise an objective lens for collecting the laser beam from the laser light source onto the information-recording medium, and a lens support for supporting the lens over the recess of the slider. The objective lens and the lens support may be integrally formed by means of, for example, plastic injection molding. The objective lens may include a magnetic coil and a yoke coated thereon. This structure makes it possible to apply a magnetic field having a high magnetic flux density to a portion of the information-recording medium extremely near to the light-radiating section. Further, the light-radiating section and the magnetic field-applying section can be integrated into one unit. As a result, the optical head is allowed to have a miniaturized size.

A layer composed of a material selected from the group consisting of silicone, alumina, and diamond-like carbon may be formed on a side of the slider opposing to the information-recording medium so that the mechanical strength is added to the slider.

According to a fourth aspect of the present invention, there is provided an apparatus for recording or reproducing information, comprising the optical head according to the third aspect, and an arm for supporting the optical head and moving the optical head with respect to an information-recording medium. The optical apparatus is also excellent in response performance, and it can perform the operation at a high speed, because the optical head has a miniaturized size, a light weight, and a thin type configuration. Therefore, the apparatus is preferably used to perform recording or reproduction on an information-recording medium subjected to high density recording, especially on a magneto-optical recording medium.

According to a fifth aspect of the present invention, there is provided a magneto-optical head for being used for an apparatus for recording or reproducing information by radiating light onto an information-recording medium, the magneto-optical head comprising:

a slider floatable over the information-recording medium;

a laser light source provided on the slider, for radiating a laser beam onto the information-recording medium;

a detector provided on the slider, for detecting the laser beam reflected from the information-recording medium;

an objective lens provided on the slider, for collecting the laser beam from the laser light source onto the information-recording medium; and a magnetic member coated on the objective lens and a magnetic coil provided on the objective lens.

The magneto-optical head according to this aspect comprises the magnetic coil and a yoke composed of the magnetic member which are provided on the objective lens. Therefore, the magnetic field having a high magnetic flux density can be efficiently applied to the light-radiating section of the information-recording medium. The coating of the yoke and the magnetic coil can be carried out in a variety of forms as exemplified in the embodiments. It is preferable that the yoke of the magnetic member includes a first extending section extending obliquely with respect to an optical axis of the lens at a light-radiating section of the objective lens, and the magnetic coil is also wound around the extending section. The yoke of the magnetic member may further comprise a second extending section opposed to the first extending section with the optical axis of the lens intervening therebetween. The second extending section can be used to catch the magnetic flux generated from the coil of the first extending section.

According to a sixth aspect of the present invention, there is provided an apparatus comprising the magneto-optical head according to the fifth aspect, and an arm for supporting the magneto-optical head and moving the magneto-optical head with respect to an information-recording medium. This apparatus makes it possible to apply an intense magnetic field to the information-recording medium. Therefore, the apparatus is used extremely preferably to perform recording and reproduction on the magneto-optical recording medium for which it is necessary to apply the magnetic field to a minute area. It is possible to shorten the transfer rate and the access time, because the magneto-optical head has the miniaturized size, the light weight, and the thin type configuration. Thus, it is possible to perform recording and reproduction at a high speed. The optical apparatus of the present invention may be provided with a plurality of magneto-optical heads to simultaneously perform recording or reproduction on a plurality of magneto-optical disks.

DESCRIPTION OF THE PREFERRED EMBODIMENTS

Embodiments of the optical head and the reproducing apparatus according to the present invention will be specifically explained with reference to the drawings. However, the present invention is not limited thereto.

First Embodiment

[Slider]

Figure 1:
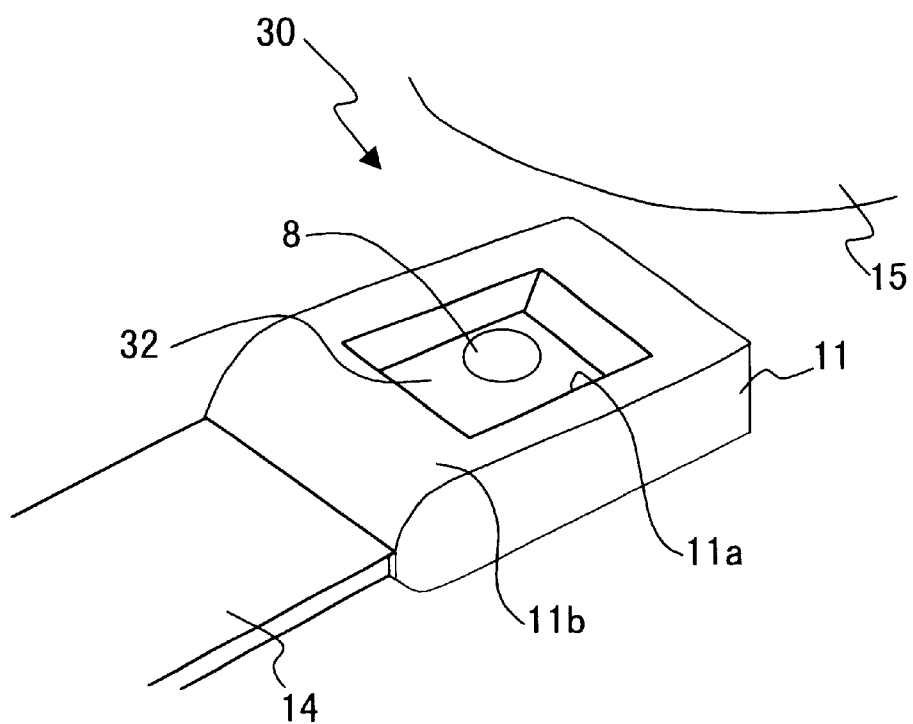
FIG. 1 shows an overall perspective view illustrating a floating optical head 30 according to an embodiment of the present invention.

FIG. 1 shows an overall perspective view illustrating a floating optical head 30 according to an embodiment of the present invention. The optical head 30 includes a slider 11. A recess 11a is formed on a slider surface 11b of the slider 11 opposing to an optical disk 15. Usually, it is necessary for the floating optical head that a variety of elements for constructing the optical head are attached to the slider 11. However, if such elements are simply laminated to the slider, the elements cause hydrodynamic troubles. In the present invention, in order to avoid this problem, the recess 11a is ensured in the slider 11, and the various elements are accommodated therein. Further, in order that the elements for constructing the optical head are not broken even when the slider 11 collides with the magneto-optical disk 15 (information-recording medium), it is desirable that a spacing distance of not less than several nm is provided between the floating surface 11b of the slider 11 and the element (lens 8 in this embodiment).

The recess 11a of the slider 11 is covered with a lens support plate 32 composed of transparent plastic for supporting the objective lens 8. The slider 11 is connected to a gimbal 14 (arm) for supporting the slider 11. In this embodiment, the slider 11 is composed of zirconia. In FIG. 1, the recess 11a is depicted with emphasis for the purpose of explanation of the drawing. However, the recess 11a of the slider, or the chip formed with the various elements to be accommodated therein is about 200 $\mu$m, while the size of the slider 11 is about 1 millimeter square. When the magneto-optical disk 15 is rotated, the slider 11 floats. The optical head 30 is positioned at a desired position over the magneto-optical disk in accordance with the tracking servo and the focusing servo as described later on. A protective layer of $Al_2O_3$ or $SIO_2$ may be applied to the surface 11b of the slider 11.

Figure 2:
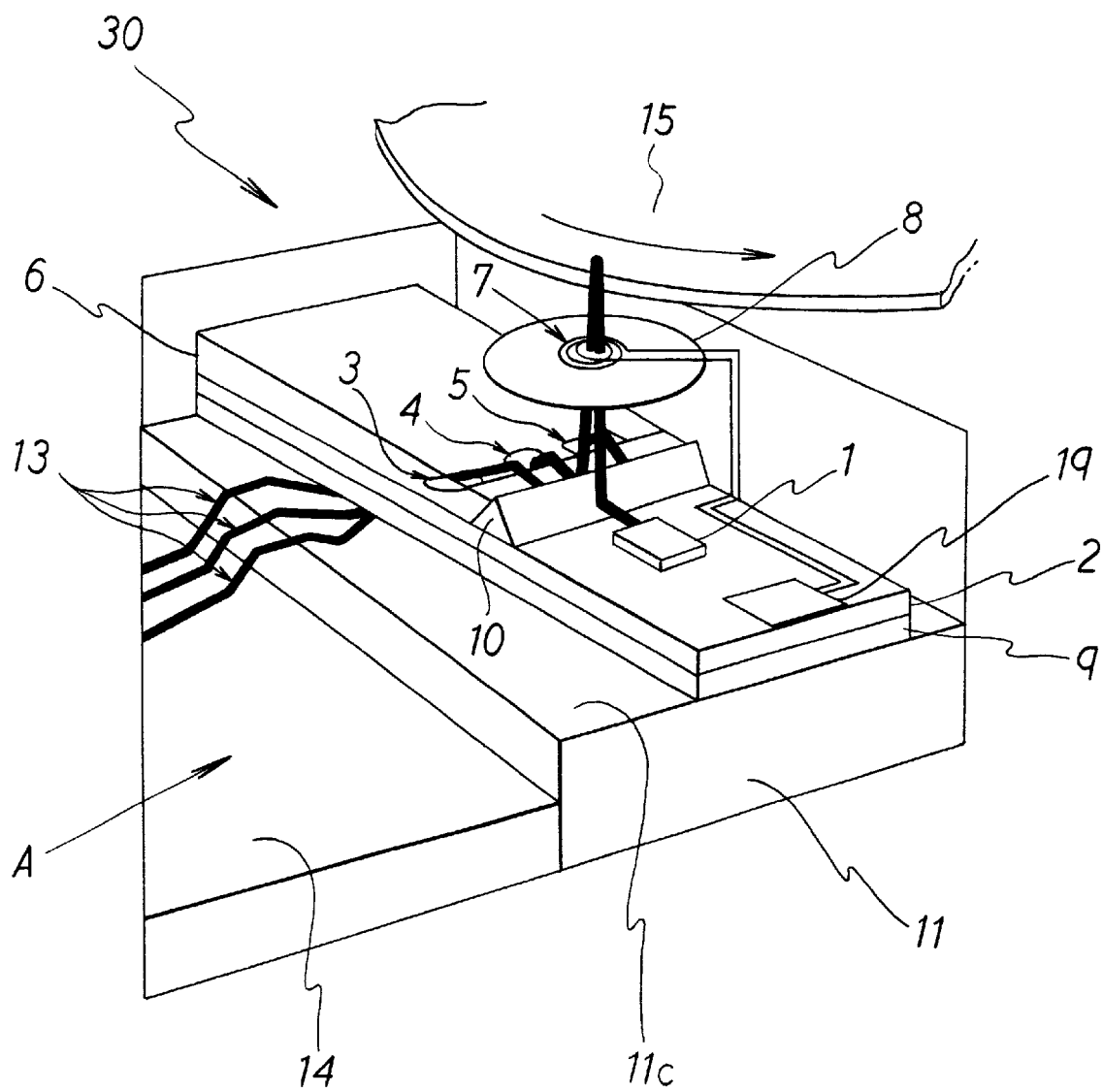
FIG. 2 shows a broken perspective view illustrating a slider for explaining respective elements of the optical head formed in a recess of the slider.
Figure 3:
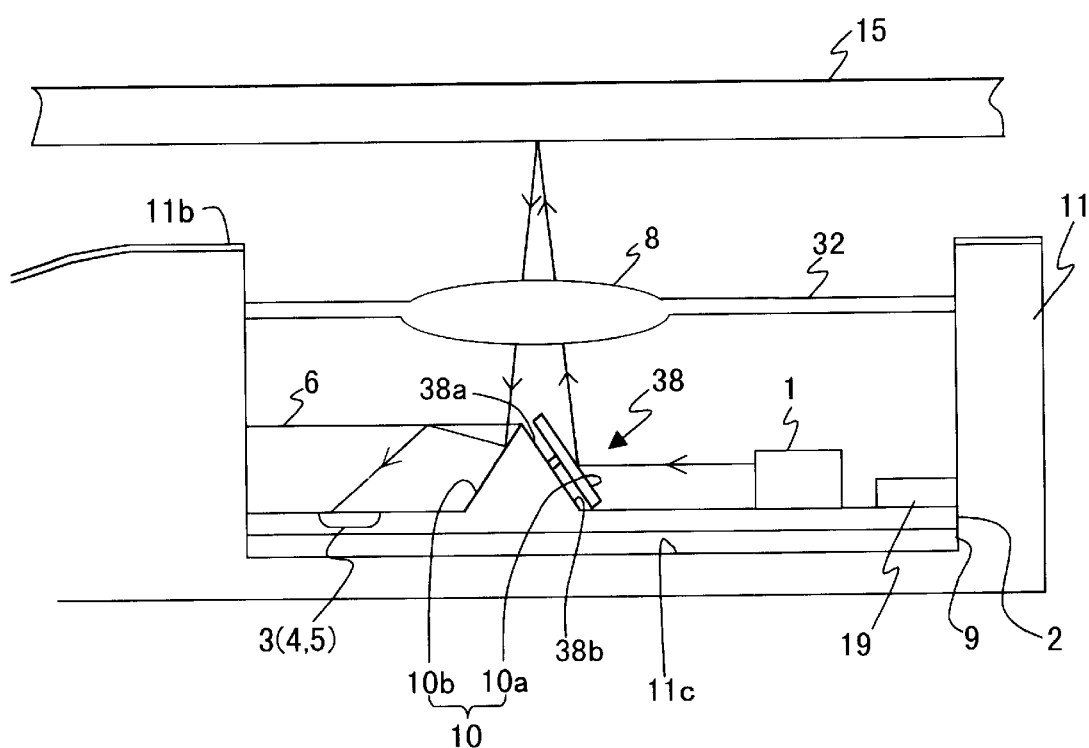
FIG. 3 shows a schematic side view illustrating the optical head as viewed in the direction of A shown in FIG. 2.
Figure 4:
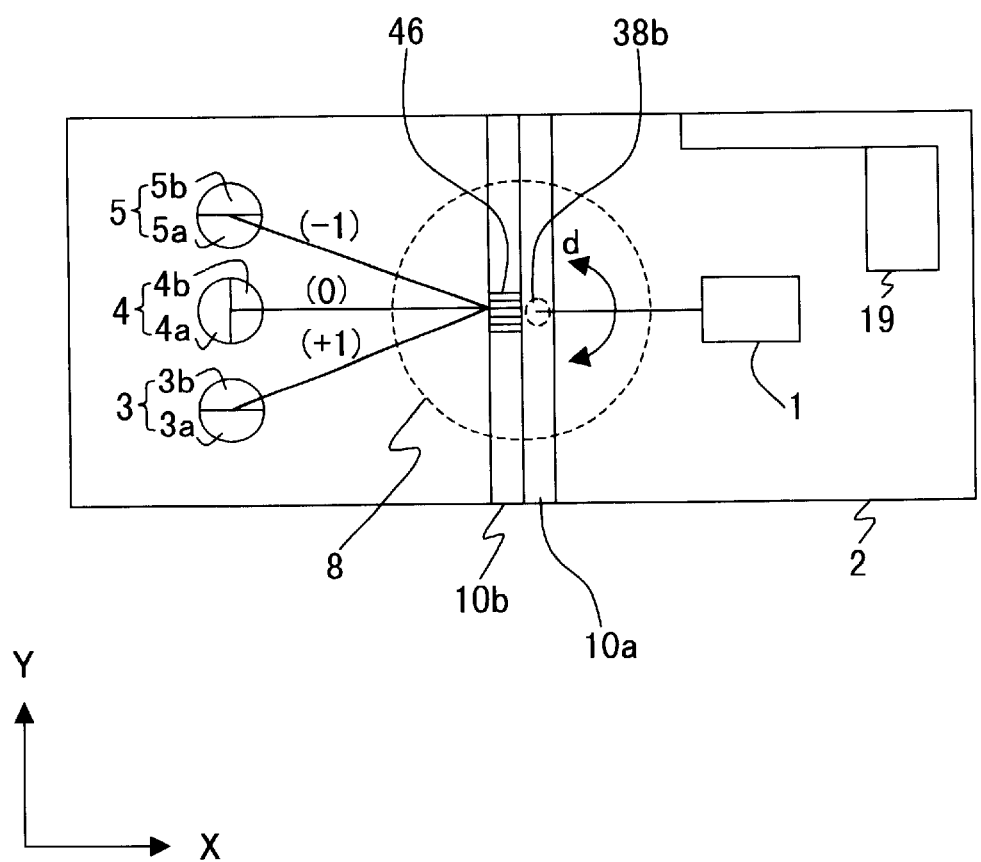
FIG. 4 shows a schematic plan view illustrating the optical head as viewed from an upward position in FIG. 2.

FIG. 2 shows a broken perspective view illustrating the slider 11 for explaining the interior of the recess 11a of the slider 11. FIG. 3 shows a schematic side view as viewed in the direction of A shown in FIG. 2, and FIG. 4 shows a schematic plan view as viewed from an upward position. As shown in FIGS. 2 to 4, the optical head 30 comprises a microactuator 9 and a GaAs substrate 2 which are successively stacked on the bottom surface 11c of the recess 11a of the slider 11. The optical head 30 further comprises a semiconductor laser 1, a deflecting mirror 10 having a triangular configuration, detectors 3, 4, 5 composed of photodiodes, and a magnetic coil-driving circuit 19 which are formed on the GaAs substrate 2 in a monolithic manner by using the semiconductor process. The method for forming these components will be described in detail later on. At first, explanation will be made for the respective elements for constructing the optical head 30 accommodated in the slider.

[Actuator for Tracking and Focusing]

The microactuator 9 moves the GaAs substrate 2 in the vertical direction (vertical direction in FIG. 3) on the basis of a detection signal from the detector 4 as described later on so that the laser beam (laser spot), which is radiated from the laser 1, may be collected with a predetermined spot size on the magneto-optical disk 15. The laser beam is appropriately focused with respect to the magneto-optical disk 15 in accordance with the movement described above. Various types of actuators are known for the microactuator which performs the vertical movement as described above. For example, it is possible to use an electrostatic comb-drive actuator as described in IEEE (1997), 0-7803-3744-1/97 (pp. 378–379).

In addition to the microactuator 9, the optical head 30 of this embodiment comprises a micromirror 38 provided with an actuator function on a reflecting surface 10a of the triangular deflecting mirror 10 in order that the laser beam radiated from the laser 1 is positioned at the predetermined track center of the magneto-optical disk 15. As shown in FIG. 3, the micromirror 38 is supported by a vertical spring 38a approximately at the center of the back surface of the reflecting surface 10a. An electric field is generated between a pair of electrodes (not shown) provided at the corner of the back surface of the reflecting surface 10a and a support wall 38b opposing to the back surface of the reflecting surface 10a. The reflecting surface 10a swings in the longitudinal direction (direction of the arrow d shown in FIG. 4) about the swinging axis of the spring 38a depending on the intensity and the polarity of the electric field. Owing to the swinging movement of the reflecting mirror 10a, the laser beam, which is radiated from the semiconductor laser 1 and which is reflected by the reflecting mirror 10a, is finely movable in the radial direction of the disk 15. The swinging movement of the reflecting mirror 10a makes it possible to position the laser spot at the central position of the desired track on the basis of the tracking signal supplied from the detectors 3, 5 as described later on.

The micromirror 38 can be formed by using the photolithography technique comprising, for example, the steps of forming electrodes, forming a photomask layer (photoresist sacrificial layer), performing reactive ion etching (RIE), and depositing spring metal. The process for producing the micromirror as described above is described in detail, for example, in "Sensor and Actuators" A66 (1998), pp. 144–149. In this embodiment, the reflecting mirror 10a (and 10b) is formed by vapor deposition of gold. The surface of the reflecting mirror 10a may be curved at a predetermined curvature in order to shape the laser beam spot reflected thereby to be circular.

[Laser Light Source]

The oscilliation wavelength of the semiconductor laser 1 is determined depending on the magneto-optical disk 15 to be subjected to recording or reproduction. In general, it is preferable to use a laser having an oscillation wavelength of 400 to 650 nm in order to realize the high density recording. For example, it is possible to use a semiconductor laser composed of GaN, GaAs, AlGaAs, AlGaAsP, or ZnSe. From a viewpoint of production, a semiconductor laser, which is composed of the same material as that for the substrate 2, is desirable, because it can be easily formed on the substrate by means of the dry process used in the semiconductor process. Therefore, this embodiment uses the GaAs semiconductor laser (red laser) 1 formed by stacking n-type AlGaAs, GaAs, and p-type AlGaAs on a (100) plane n-type GaAs substrate provided with the electrodes at the back thereof. As described later on, a blue laser capable of oscillation at a short wavelength uses a sapphire substrate. The sapphire substrate can be used as a slider as it is, because it has a high strength. When the substrate 2 can be processed as the slider 11 as it is, it is possible to omit, for example, the operation of lamination and positional adjustment accompanying thereto. Therefore, it is possible to simplify the production process, and it is possible to realize a miniaturized size and a light weight of the optical head.

[Objective Lens]

As shown in FIG. 3, the objective lens 8 is supported by the lens support plate 32. As described above, in order to avoid any breakage of the lens 8 upon the contact of the slider 11 with the magneto-optical disk 15, the support plate 32 is attached to the slider 11 so that the upper end of the lens 8 is disposed at a position slightly lower than the floating surface 11b of the slider 11. The lens 8 and the support plate 32 can be integrally formed by means of injection molding of plastic. A lens having high NA such as SIL (solid immersion lens) may be used as the lens 8.

[Magnetic Field-applying Unit]

Figure 5:
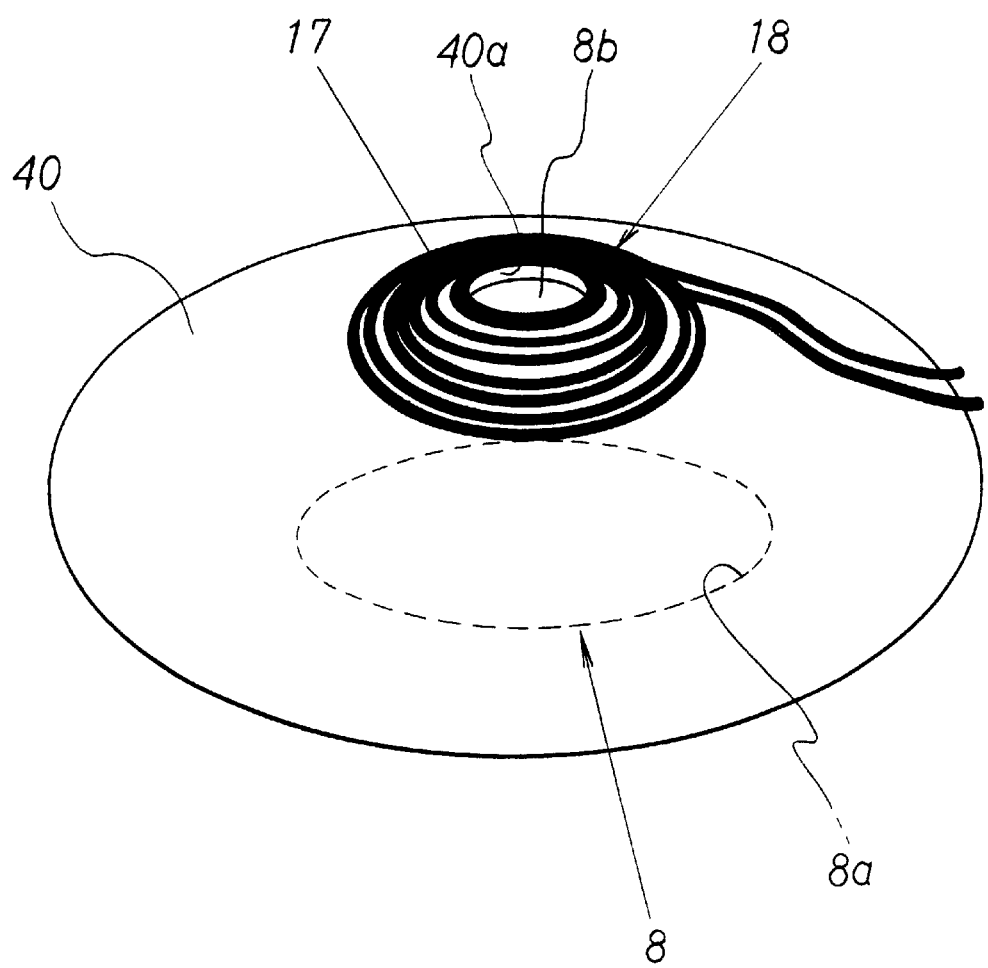
FIG. 5 conceptually shows an arrangement of a magnetic coil and a yoke coated on an objective lens.

The objective lens 8 shown in FIGS. 1 to 4 is magnified and shown in FIG. 5. A pattern copper wire 18 is wound around the lens 8 about the center of the optical axis of the lens. A current is allowed to flow through the copper wire 18 to function as the magnetic coil (7). The copper wire 18 may be formed by vapor deposition of copper on the lens or the yoke as described later on. Alternatively, a copper wire may be directly glued onto the lens or the yoke.

In general, when information is recorded (or reproduced) on the magneto-optical disk 15, it is necessary to efficiently apply the magnetic field to the recording area of the disk 15. The intensity of the magnetic field generated by the copper wire 18 is inversely proportional to the distance between the copper wire 18 and the recording film of the magneto-optical disk 15. Therefore, the copper wire 18 is provided at the position nearest to the magneto-optical disk 15, i.e., in the vicinity of the light-outgoing section 8b of the lens. On the other hand, it is desirable to suppress the heat generation which is caused by the flow of current through the copper wire 18. The length of the copper wire 18 provides the resistance as a heat generation source. Therefore, the copper wire 18 is desirably wound as shown in FIG. 5 in order to obtain the shortest length of the copper wire. It is desirable that the copper wire 18 is arranged so that the laser light flux is not radiated onto the copper wire 18.

As shown in FIG. 5, the lens 8 is covered with a yoke 40 composed of a ferromagnetic material, for example, permalloy (FeNi alloy), except for the light-incoming section 8a on the lower surface of the lens 8 and the light-outgoing section 8b on the upper surface of the lens. The end of the yoke 40 on the side of the light-outgoing section 8b protrudes upwardly (in the direction of the optical axis of the lens) to form a ring-shaped wall 40a. The copper wire 18 for constructing the magnetic coil forms a so-called hollow core coil. Therefore, the magnetic field intensity is restricted. In view of this point, the yoke 40 is provided in order to increase the magnetic flux density of the magnetic field generated in the vicinity of the light-outgoing section 8b. The yoke 40 can be formed by partially coating a ferromagnetic material around the lens by means of, for example, vapor deposition, sputtering, and plating. The ferromagnetic material has a heat-releasing effect, because it is a metal such as permalloy, which is also advantageous in that the heat generated by the magnetic coil and the heat generated by the radiation of the laser beam can be released. Further, in order to avoid the increase in temperature of the lens, the lens may be covered with ceramic.

When it is difficult to effect the integrated formation of the lens 8 and the copper wire 18 of the magnetic coil, the floating amount of the slider 11 may be increased, in which a coil is printed on a transparent substrate to be inserted between the slider 11 and the magneto-optical disk 15. In this arrangement, it is sufficient that only a central portion of the coil is transparent. Therefore, in place of the transparent substrate, a passage for the light flux may be bored through a thin plate of permalloy to wind a coil therearound. In this arrangement, the coil is disposed on the side of the disk 15.

A driving circuit 19 for the magnetic coil 7 composed of the copper wire 18 is provided on the substrate 2 as shown in FIGS. 2 to 4, because of the following reason. That is, if the driving circuit for the magnetic coil is provided not on the floating head 30 but on the side of the main recording and reproducing apparatus body, then the wiring arrangement for connecting the magnetic coil to the driving circuit is long, and the impedance is increased, resulting in the decrease in magnetic field driving speed. In the present invention, the magnetic coil-driving circuit 19 can be also formed monolithically with the other elements on the substrate 2 in accordance with the semiconductor process. In order to release, to the slider 11, the heat generated from the driving circuit 19, it is preferable that the driving circuit 19 is coated with a metal having high thermal conductivity (for example, Cu, Au, and Ag), or the driving circuit 19 is accommodated in a block of such a metal.

[Optical Guide Unit]

As shown in FIG. 3, the laser beam, which is radiated from the semiconductor laser 1, is reflected by the reflecting mirror 10a of the triangular deflecting mirror 10, and it is collected by the objective lens 8 to irradiate a predetermined recording area (not shown) of the magneto-optical disk 15 therewith. The reflected light beam (reproducing light beam) from the recording area of the magneto-optical disk 15 is transmitted through the objective lens 8 again, and it is reflected by the reflecting mirror 10b of the deflecting mirror 10. In this embodiment, as shown in FIGS. 2 and 3, a transparent dielectric member 6, which is composed of, for example, $SiN_x$ or $SiO_2$, is deposited on the substrate 2 on the side of the reflecting mirror 10b to form a prism. Accordingly, as shown in FIG. 3, the returning light beam from the disk 15 comes into the transparent dielectric member 6, and it is reflected by the reflecting mirror 10b. After that, the light beam is reflected again by the inner surface (upper surface) of the transparent dielectric member 6, and it comes into the detector 3 (4, 5). That is, the transparent dielectric member 6 guides the reproducing light beam to the detectors 3 to 5. The transparent dielectric member 6 can be formed on the substrate 2, for example, by means of the sputtering or the vapor deposition method by using the semiconductor process. In order to optimize the optical paths to the detectors 3 to 5, the transparent dielectric film can be stacked little by little while detecting the amount of light received by the detectors 3 to 5.

As shown in FIG. 4, the reflecting mirror 10b is engraved with minute grooves at predetermined intervals in the direction of inclination of the reflecting mirror 10b (in the horizontal direction in the drawing). A diffraction grating 46 is formed thereby. The diffraction grating 46 divides the laser beam transmitted through the lens 8 into those in three directions by means of diffraction. The respective divided laser beams are allowed to come into the detectors 3, 4, 5. The laser beams, which outgo from the diffraction grating 46, are directed as follows. That is, the 0-order diffracted light beam is directed to the central detector 4, the +1-order light beam is directed to the detector 3, and the −1-order light beam is directed to the detector 5.

In this embodiment, the reflecting mirror 10b and the transparent dielectric layer 6 function as the optical guide unit. It is also allowable that the transparent dielectric layer 6 is omitted to adjust the angle of inclination of the reflecting mirror 10b so that the returning light beam from the disk 15 is directly introduced into the detectors 3 to 5. In this arrangement, the reflecting mirror 10b functions as the optical guide unit.

[Photodetector]

As shown in FIG. 4, the detectors 3 to 5 are arranged in the direction (Y direction in the drawing) in which the deflecting mirror 10 extends. The detectors 3 to 5 are embedded in the substrate 2 respectively. Each of the detectors includes two light-receiving sections in a divided manner. Each of the detectors 3 and 5 includes two light-receiving sections arranged in the Y direction in the drawing in a divided manner. The detector 4 includes two light-receiving sections arranged in the X direction in the drawing in a divided manner, and it is used to detect the autofocus signal. In this embodiment, each of the detectors 3 to 5 is made of a GaAs photodiode. When an Si substrate is used, an Si photodiode may be formed.

Next, explanation will be made for the focusing and the tracking for the magneto-optical disk 15 based on the use of the detectors 3 to 5. Usually, the magneto-optical disk 15 is formed with a guide groove for tracking. The tracking is performed by making the control so that the both ends of the light spot focussed on the recording film surface equivalently cover a pair of grooves which define the track. Also in this embodiment, the magneto-optical disk 15 includes the guide groove (not shown). The tracking for the magneto-optical disk 15 will be specifically explained. When the light spot is disposed just at the center of the track, an equal amount of reflected light beam is obtained from the grooves on the both sides. Therefore, an equal amount of received light is obtained for the light-receiving sections 3a, 3b of the two-division detector 3 (or 5) as shown in FIG. 4. When the light spot is deviated toward any one of the guide grooves, the amount of received light differs between the light-receiving sections 3a, 3b. The tracking deviation can be corrected by making the swinging movement of the reflecting mirror 10a of the micromirror 38 so that the amount of received light is balanced for the light-receiving sections 3a, 3b. Accordingly, the differential signal between the light-receiving sections 3a, 3b of the detector 3 provides a tracking error signal. A similar signal is also obtained by using the detector 5. Therefore, a sum signal is obtained for the light-receiving sections 3a, 5a of the detectors 3, 5, and a sum signal is obtained for the light-receiving sections 3b, 5b. Subsequently, a difference between the sum signals (differential signal) is determined. The differential signal can be used as the tracking error signal.

The detector 4 for detecting the focus error signal is operated as follows. That is, an equal amount of received light is obtained for the two light-receiving sections 4a, 4b of the detector 4 in the case of the just focus. Therefore, the focus error signal can be detected by obtaining a differential signal from the two light-receiving sections.

The sample servo system, in which the tracking is effected by using the pit formed on the disk, is also available other than the tracking based on the use of the guide groove on the magneto-optical disk. In this case, the tracking control can be made in the same manner as described above by using the detectors 3, 4 of the optical head,30.

The reflected light beam from the disk is divided into the p-wave and the s-wave by the diffraction grating 46 shown in FIG. 4. The p-wave is detected by the detector 3, and the s-wave is detected by the detector 5. Therefore, a magneto-optical signal is obtained from a differential signal therebetween.

[Gimbal (Optical Head Arm)]

With reference to FIG. 2 again, the printed wiring is formed as shown in FIG. 2 for the power source wiring to the semiconductor laser 1, the power source wiring and the signal wiring to the detectors, and the power source line and the signal line to the microactuator 9. The wiring is not printed in the case of an ordinary recording and reproducing apparatus for the magneto-optical disk. Therefore, a problem arises in that the tensile force of the wiring disturbs the movement of the gimbal 14. However, in the present invention, the printed wiring makes it possible to allow the slider 11 to float in a stable manner. The printing wiring can be joined to the circuit on the slider by means of bonding by using the Au wire. When the slider 11 floats stably, the optical path length also has a constant value between the disk 15 and the lens 8 and the detectors 3, 4, 5 supported in the slider. Therefore, the position of the lens 8 can be previously determined in conformity with the floating amount. Accordingly, the focus of the lens 8 is always constant. Therefore, it is possible to omit the focusing servo.

Usually, when the disk is rotated, the gimbal 14 is vigorously vibrated. In order to prevent the printed wiring from being peeled off, it is desirable that a substance such as Cr for enhancing the tight adhesion to the printed wiring is allowed to intervene for the gimbal 14 or a suspension by means of, for example, sputtering or plating.

[Production Process]

Next, explanation will be made for the method for forming, on the GaAs substrate, the semiconductor laser 1, the deflecting mirror 10, the detectors 3 to 5, and the transparent dielectric member 6 respectively. At first, an Au electrode is provided by MOCVD on the back surface of the n-type GaAs substrate having the (100) plane. Subsequently, the deflecting mirror 10 can be formed in accordance with the dry process as follows. For example, the central portion of the substrate is etched by means of the anisotropic etching to allow a projection having a triangular prism-shaped configuration to remain. Subsequently, those other than the triangular prism-shaped projection are masked by means of the photolithography to vapor-deposit Au on the reflecting surface 10b of the projection. The micromirror 38 can be formed in accordance with the method described above. The reflecting mirror 10a on the micromirror 38 can be formed by vapor-depositing gold or aluminum. In order to produce the semiconductor laser 1 and the detectors 3 to 5 on the n-type GaAs substrate, the flat portion other than the deflecting mirror 10 is subjected to the dry etching. Subsequently, the n-type AlGaAs, GaAs, p-type AlGaAs, and Au electrodes are successively allowed to grow on the portion of the substrate for constructing the semiconductor laser 1 by using MOCVD. As for the portions of the substrate for constructing the detectors 3, 4, 5, the n-type GaAs, p-type GaAs, and Au electrodes can be formed by means of MOCVD. After the detectors 3 to 5 are formed, the transparent dielectric member 6 can be deposited by means of the vapor deposition or the sputtering as described above.

[Arrangement of Recording and Reproducing Apparatus]

Figure 8:
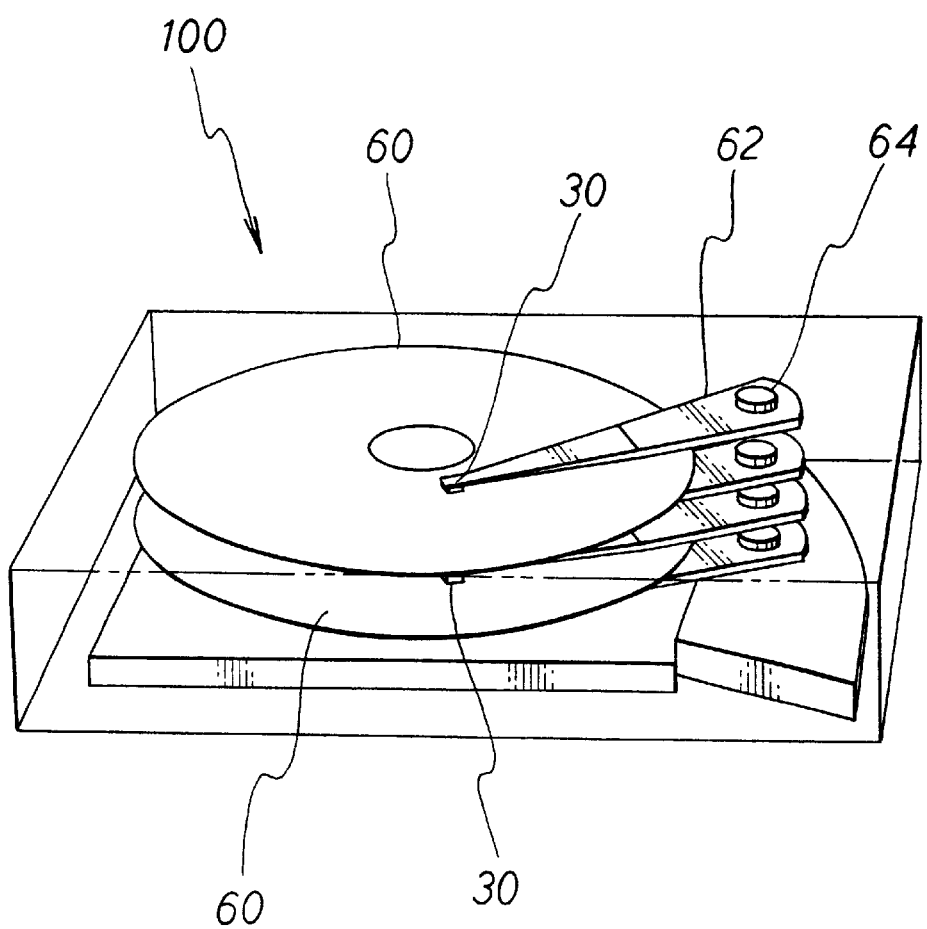
FIG. 8 shows a schematic arrangement of a recording and reproducing apparatus according to the present invention.

FIG. 8 shows an example of the arrangement of the reproducing apparatus 100 for the magneto-optical disk provided with the optical head according to the present invention. The thickness of the floating slider 11 of the optical head 30 of the present invention can be made thin. Therefore, as shown in FIG. 8, a plurality of disks 60 can be coaxially supported at a predetermined spacing distance as in a magnetic disk apparatus, and the floating heads 30 can be provided for both surfaces of the respective disks. A suspension 62 for supporting the floating head 30 is moved as follows. That is, the suspension 62 can be coarsely moved by using a voice motor 64 or the like, and it can be finely moved by using a microactuator (not shown).

Second Embodiment

Figure 6:
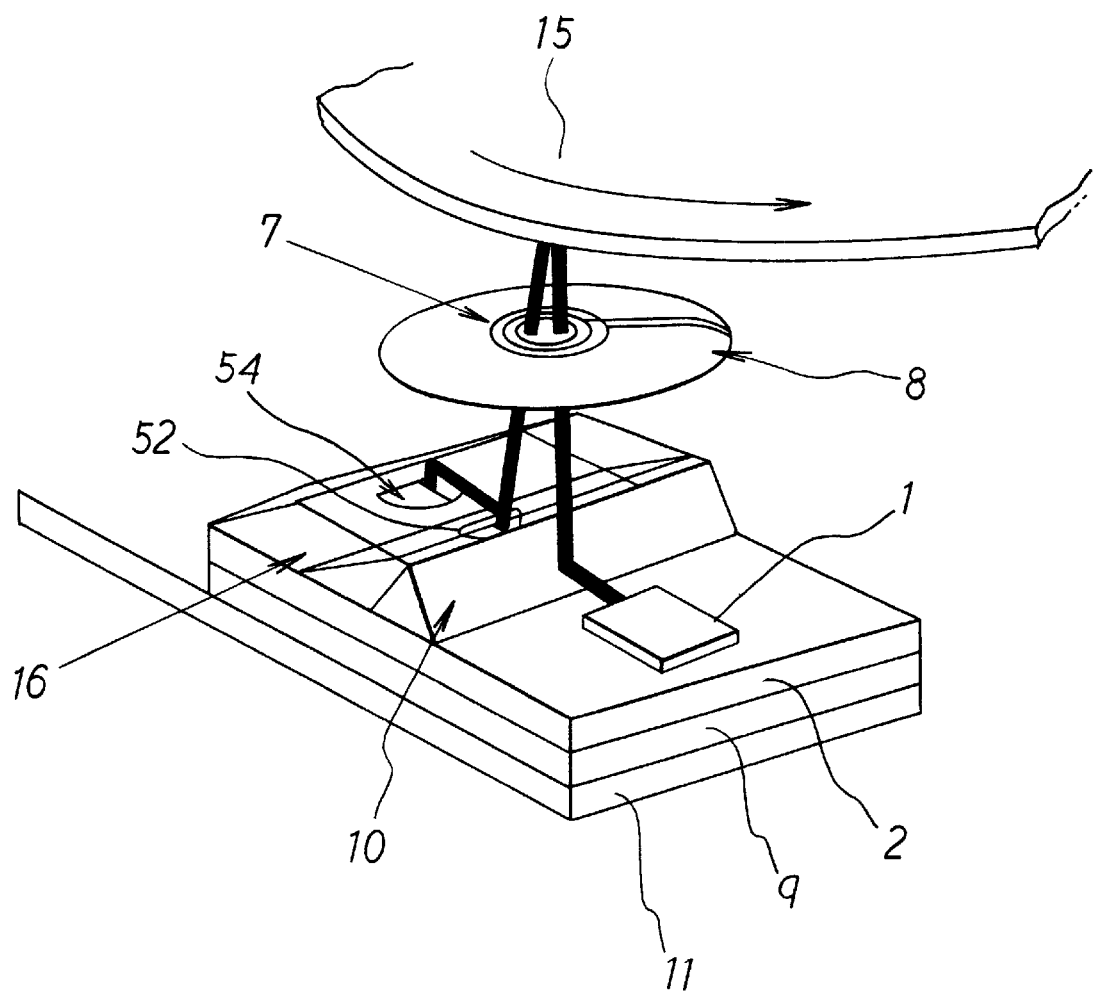
FIG. 6 shows a schematic arrangement of an optical head according to a second embodiment of the present invention.
Figure 7:
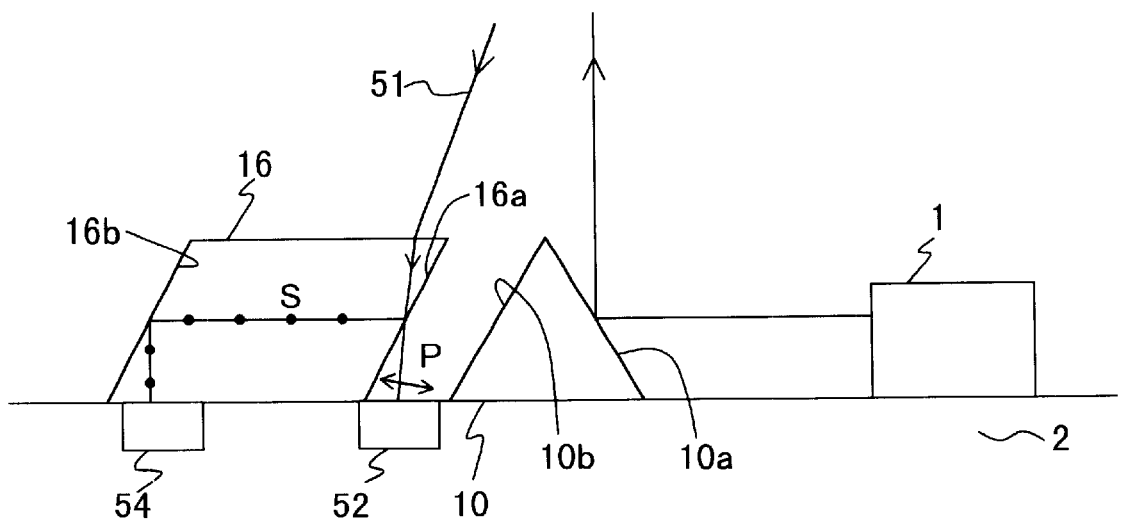
FIG. 7 illustrates an optical path of a laser beam in a microprism used for the optical head shown in FIG. 6.

Another embodiment of the optical head of the present invention will be explained with reference to FIG. 6. However, the same components or parts as those of the first embodiment are designated by the same reference numerals, explanation of which will be omitted. In the first embodiment, the diffraction grating 46 engraved on the reflecting mirror 10b is used to guide the light to the detectors 3 to 5 which are arranged in the Y direction. In this embodiment, an optical head is explained, in which the diffraction grating 46 is not used, but a microprism 16 is used as shown in FIG. 6. In this optical head, as shown in FIG. 7, the reproducing light beam 51, which is reflected from the magneto-optical disk 15, comes into the microprism 16 not into the reflecting mirror 10b, and it is divided on its light-separating surface 16a. That is, the p-light beam, which oscillates in parallel to the incident plane for the reproducing light beam 51 into the microprism 16, is transmitted through the light-separating surface 16a, and it comes into a detector 52. The s-light beam, which oscillates perpendicularly to the incident plane for the reproducing light beam 51 into the microprism 16, is reflected by the light-separating surface 16a of the microprism 16, and it travels at the inside of the microprism. The s-light beam is reflected by a reflecting surface 16b, and then it comes into a detector 54. Each of the detectors 52, 54 is a two-division detector similar to the detectors 3, 5 used in the first embodiment.

Third Embodiment

Figure 9:
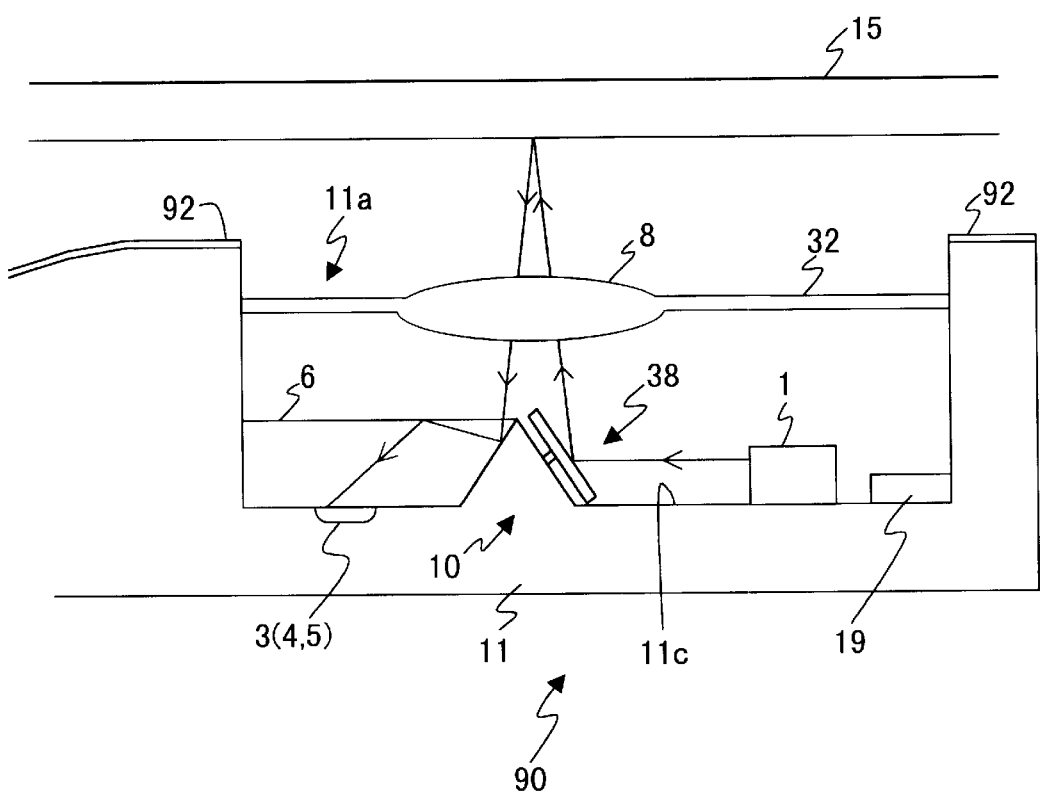
FIG. 9 shows a schematic arrangement of an optical head according to a third embodiment of the present invention, in which a slider is composed of a substrate material in this embodiment.

This embodiment is illustrative of an optical head 90 in which the semiconductor substrate 2 itself used in the first embodiment is processed into a slider 11. As shown in FIG. 9, GaAs or sapphire is processed to have a shape of the slider 11, and then a recess 11a is formed. The semiconductor laser 1, the deflecting mirror 10 provided with the micromirror 38, the detectors 3 to 5, and the transparent dielectric member 6 may be formed on the bottom 11c of the recess 11a respectively in the same manner as in the first embodiment. In general, the semiconductor material is not sufficient in mechanical strength. Therefore, a material such as diamond-like carbon, which is excellent in wear resistance, is coated as a coating layer 92. For example, when a sapphire laser (blue laser) is used as the semiconductor laser 1, then a sapphire substrate may be used for the slider material, and the semiconductor laser is allowed to grow directly thereon. Sapphire is preferred in view of the mechanical strength, because it is hard.

In this embodiment, the slider 11 also serves as the substrate. Therefore, it is unnecessary to perform the surface adjustment and the positional adjustment between the semiconductor substrate and the slider. Thus, it is possible to simplify the production steps. Further, it is possible to decrease the number of parts, and the optical head 90 can be allowed to have a more miniaturized size and a lighter weight.

In this embodiment, the microactuator for the focusing servo may be provided on the gimbal or the connecting portion between the gimbal and the slider 11. Alternatively, the focusing servo may be omitted by previously positioning the lens 8 in accordance with the floating amount of the slider.

Fourth Embodiment

Figure 10:
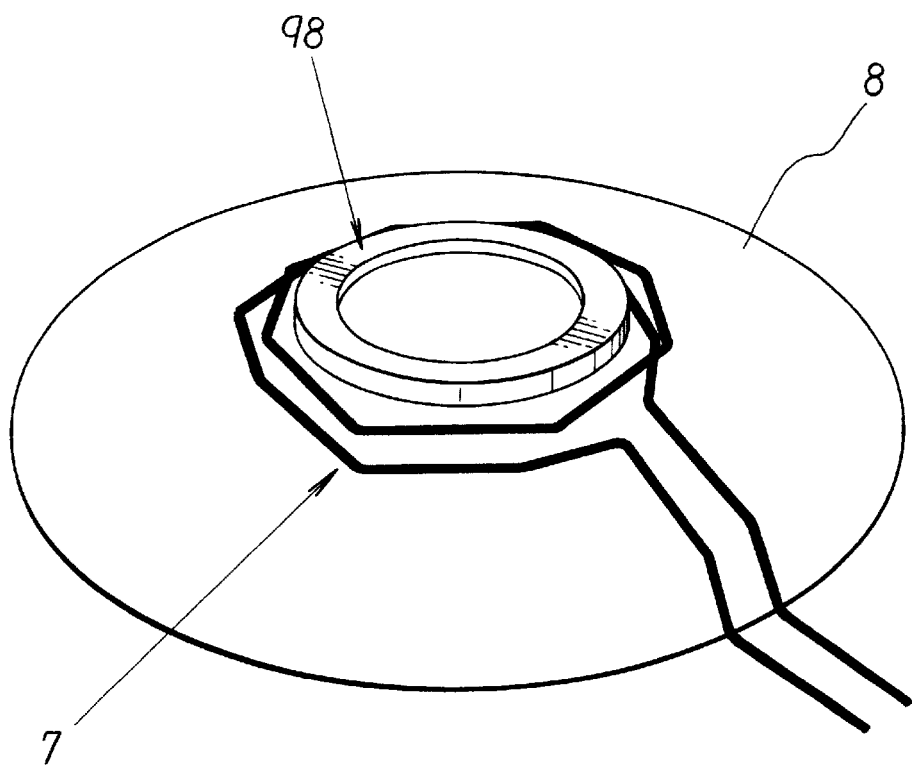
FIG. 10 conceptually shows another illustrative arrangement of a magnetic coil and a yoke coated on an objective lens.

This embodiment is illustrative of a magnetic coil and a yoke which are different from the magnetic coil and the yoke provided for the lens 8 of the optical head 30 of the first embodiment. In the embodiment shown in FIG. 10, the yoke 40 for covering the objective lens 8 in the embodiment shown in FIG. 5 is omitted, and only an annular yoke 98 is provided at the inside of the magnetic coil 7.

Figure 11:
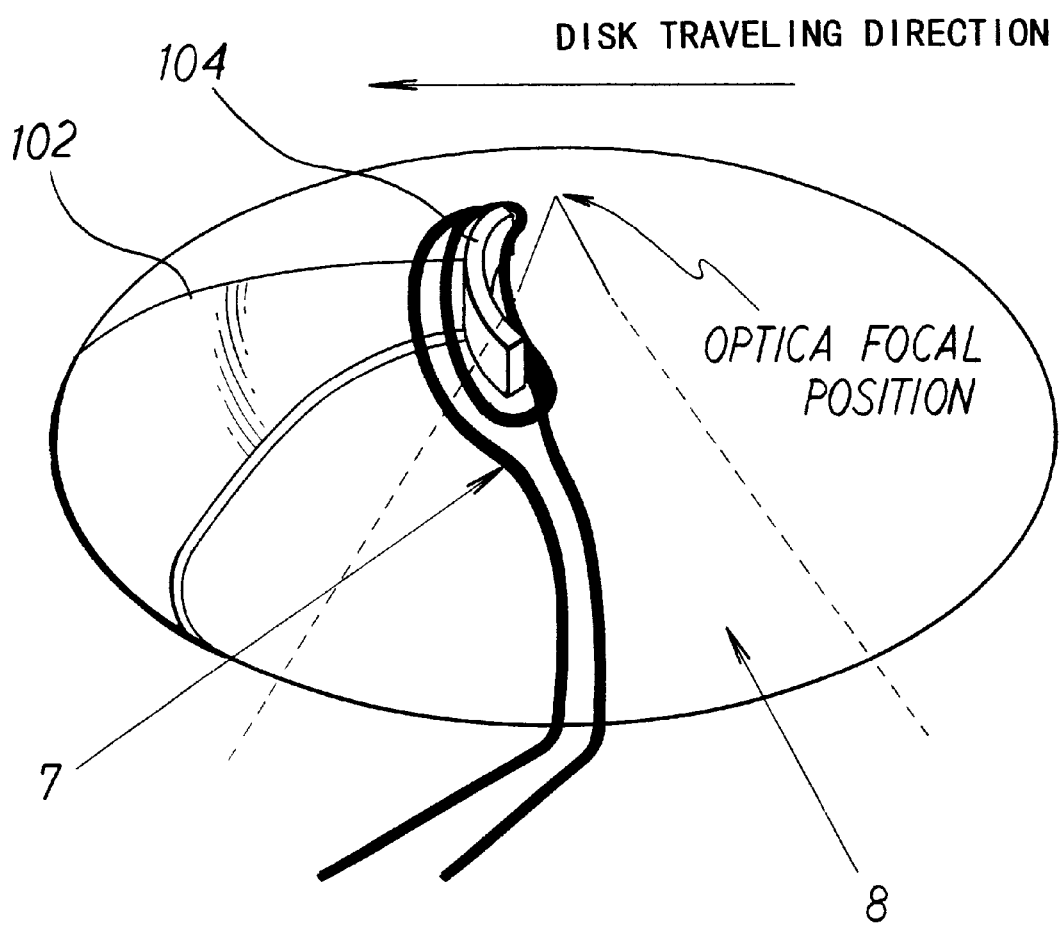
FIG. 11 conceptually shows still another illustrative arrangement of a magnetic coil and a yoke coated on an objective lens.

In the embodiment shown in FIG. 11, the yoke 102 covers only a part of the lens in the circumferential direction. The yoke 102 extends in the axial direction of the lens in the vicinity of the light-radiating section of the lens 8 to define a yoke wall 104. The yoke wall 104 is provided at only a part in the circumferential direction in the vicinity of the light-radiating section. The magnetic coil 7 is wound to surround the yoke wall 104. Even in the case of the arrangement as described above, the magnetic field can be applied to the light-radiating section by the magnetic coil 7. When the magnetic coil is long, the response performance of the applied magnetic field is lowered. The magnetic coil 7 of this arrangement is excellent in response performance of the applied magnetic field, because it is relatively short.

Fifth Embodiment

Figure 12:
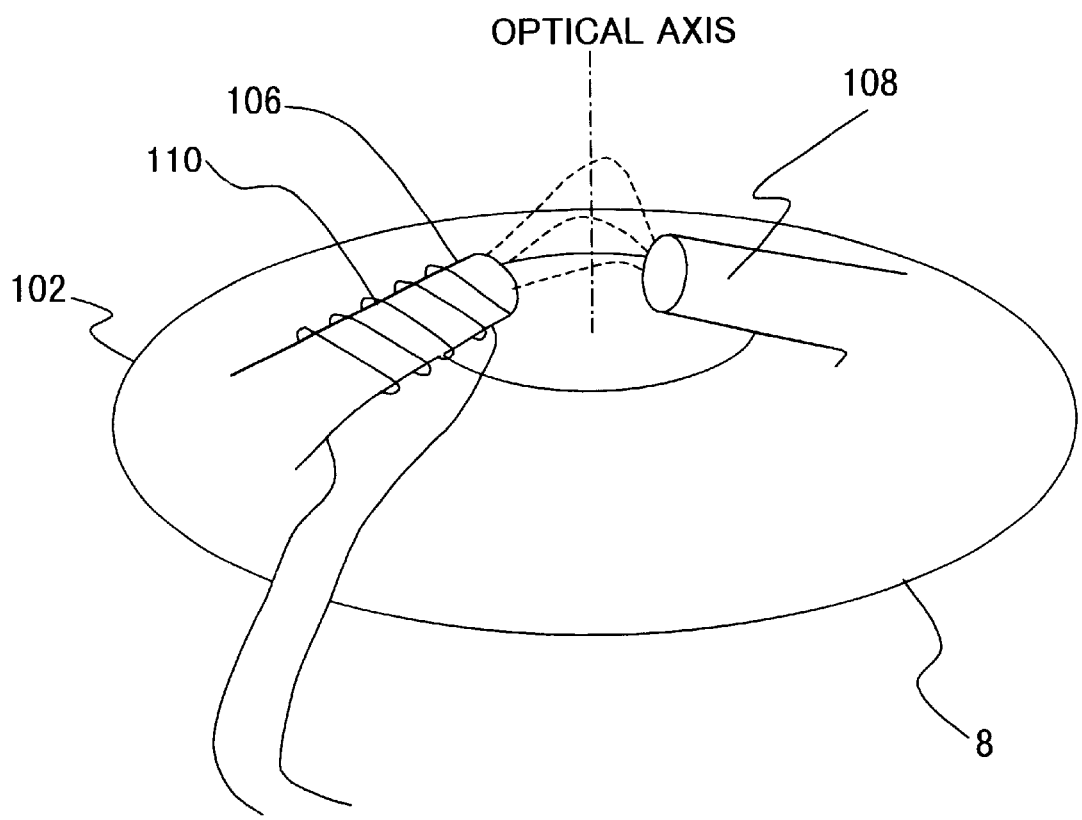
FIG. 12 conceptually shows still another illustrative arrangement of a magnetic coil and a yoke coated on an objective lens, in which a magnetic flux is projected obliquely with respect to an optical axis.

This embodiment further describes an illustrative different arrangement of the magnetic coil and the yoke. As shown in FIG. 12, a yoke 102 covers the lens except for the light-incoming section and the light-outgoing section, in the same manner as in the first embodiment. Further, a yoke 106 protrudes and extends from the slant surface of the lens so that it obliquely intersect the optical axis of the lens. A yoke 108 also protrudes and extends so that it obliquely intersect the optical axis of the lens in such a way that the yoke 108 is opposed to the yoke 106. A magnetic coil 110 is wound around only the first horn-shaped yoke 106. When the arrangement is made as described above, then the magnetic flux (shown by broken lines in the drawing), which is generated from the magnetic coil 110 wound around the first yoke 106, travels obliquely with respect to the optical axis, and it is caught by the second yoke 108. The magnetic flux in the oblique direction contains the magnetic flux component in the vertical direction (direction of the optical axis). Therefore, this arrangement is effective for the perpendicular magnetic recording. owing to the fact that the magnetic flux can be applied in the oblique direction, the restriction is mitigated for the installation position of the magnetic coil, and thus the magneto-optical head can be easily designed.

Figure 13:
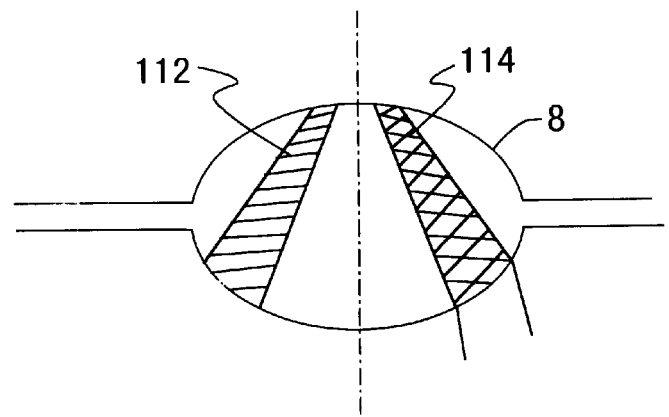
FIG. 13 shows a schematic sectional view illustrating still another illustrative arrangement of a magnetic coil and a yoke charged in an objective lens.

A modified embodiment of the embodiment shown in FIG. 12 is shown in a sectional view illustrating a lens in FIG. 13. As shown in FIG. 13, a rod-shaped magnetic flux-catching yoke 112 and a yoke 114 provided with a coil may be embedded in the lens 8.

Sixth Embodiment

Figure 14A:
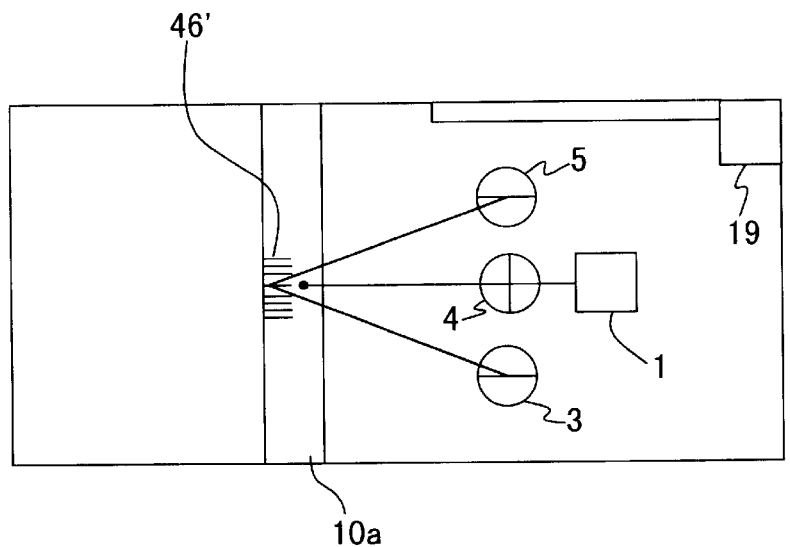
FIG. 14A shows a plan view illustrating a modified embodiment of the first embodiment shown in FIG. 4, depicting an arrangement in which detectors are disposed on the same side as that of a semiconductor laser with respect to a deflecting mirror.
Figure 14B:
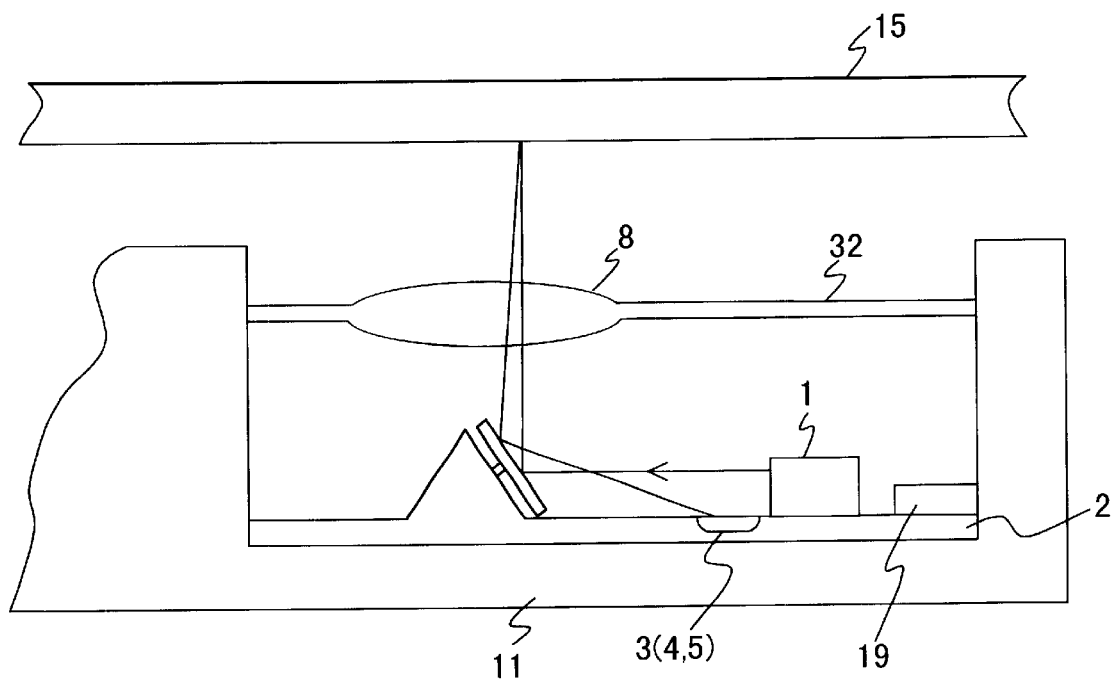
FIG. 14B shows a side view illustrating an optical head shown in FIG. 14A.

This embodiment is illustrative of a case as shown in FIGS. 14A and 14B in which the detectors 3 to 5 of the optical head according to the first embodiment are provided on the same side as that of the semiconductor laser 1 with respect to the deflecting mirror 10. In this arrangement, the radiating light beam from the semiconductor laser 1 is reflected by the reflecting surface 10a of the deflecting mirror, and it passes through the lens 8 to radiate the disk 15. After that, the light beam is transmitted through the lens 8 again, and it comes into a diffraction grating 46' engraved on an upper portion of the reflecting surface 10a. The light beam is diffracted into +1-order, 0-order, and −1-order light beams which directly come into the detectors 3, 4, 5 respectively. This arrangement is advantageous in that the areal size of the chip or the substrate can be reduced to the half, and the optical head can have a further miniaturized size.

Seventh Embodiment

Figure 15:
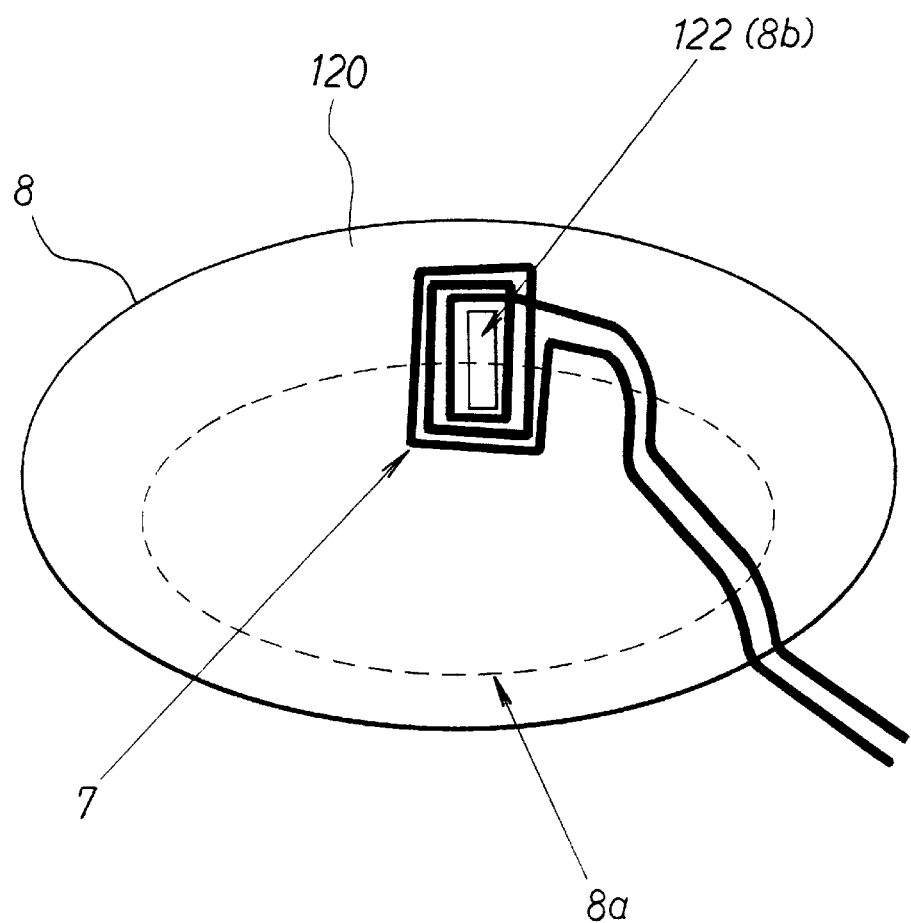
FIG. 15 shows a schematic perspective view illustrating still another illustrative arrangement of a magnetic coil and a yoke coated on an objective lens, in which recording or reproduction is performed by using evanescent light in this embodiment.

A further different illustrative arrangement of the yoke is shown in FIG. 15. A yoke 120 made of permalloy covers the area of the objective lens 8 except for the light-incoming area and the light-outgoing area in the same manner as in the fourth embodiment. However, the light-outgoing area 122 is formed to have a slit-shaped configuration. The slit width is shorter than the wavelength of the laser beam. Therefore, the leakage of evanescent light occurs through the slit 122 under the condition of near field, making it possible to perform recording or reproduction by using the evanescent light. Accordingly, recording and reproducing can be performed for an extremely small magnetic domain.

Eighth Embodiment

Figure 16:
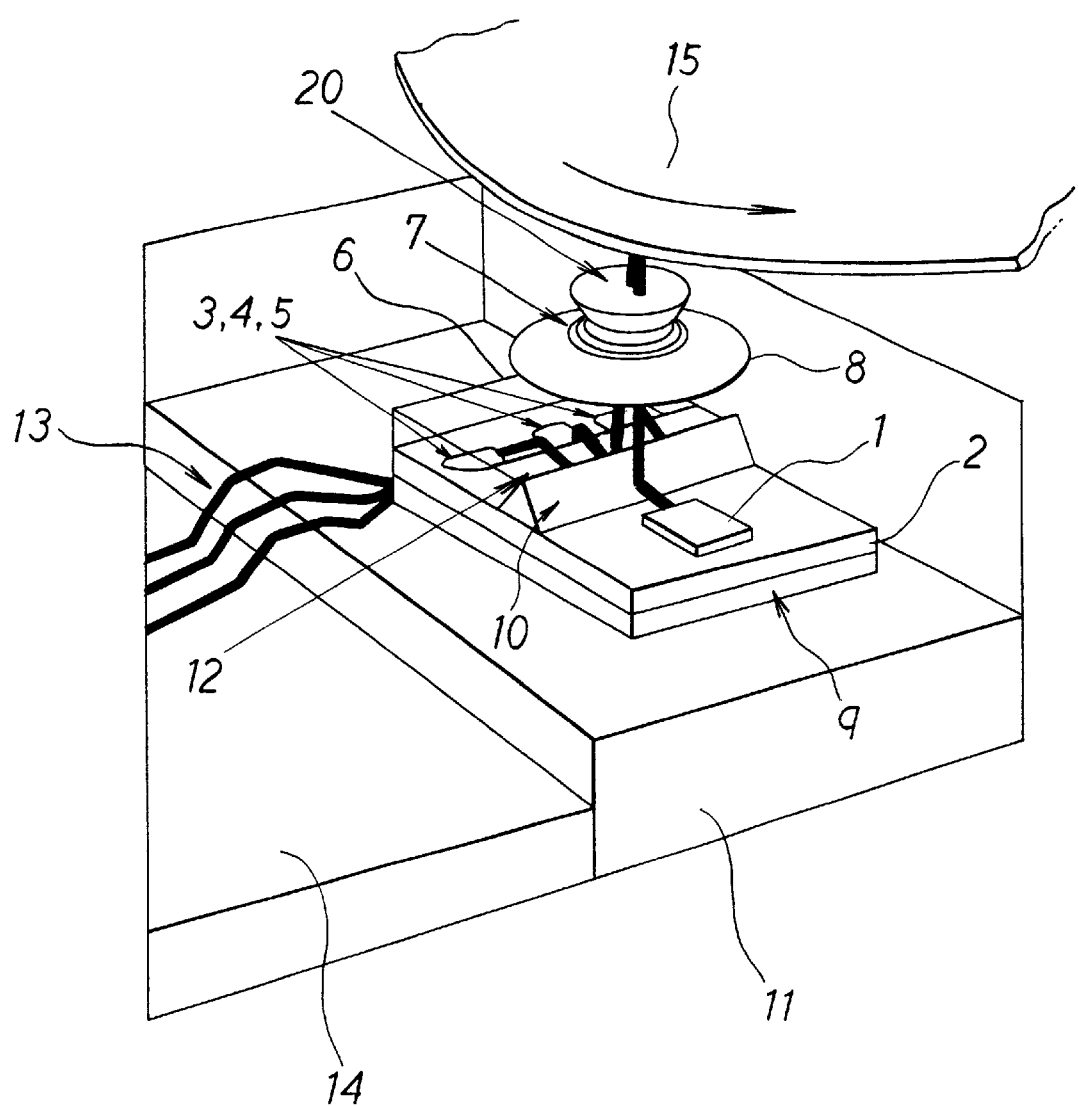
FIG. 16 shows a schematic perspective view illustrating an optical head according to an eighth embodiment, which is illustrative a case in which a hemispherical lens is provided between an objective lens and a disk 1.

In the embodiments described above, the optical recording and reproducing head having the light weight and the miniaturized size for the high density recording and reproduction has been described. In order to obtain a higher density, it is effective to provide a hemispherical lens 20 as shown in FIG. 16 for further converging the light flux on the objective lens 8 as shown in FIG. 2 on the side of the disk 15. One or more hemispherical lens or lenses may be used. As described above, the floating head floats stably in the aerodynamic manner. Therefore, it is unnecessary to provide any control mechanism for adjusting the focal point of the hemispherical lens. The objective lens 8 and the hemispherical lens 20 may be fixed.

Figure 17:
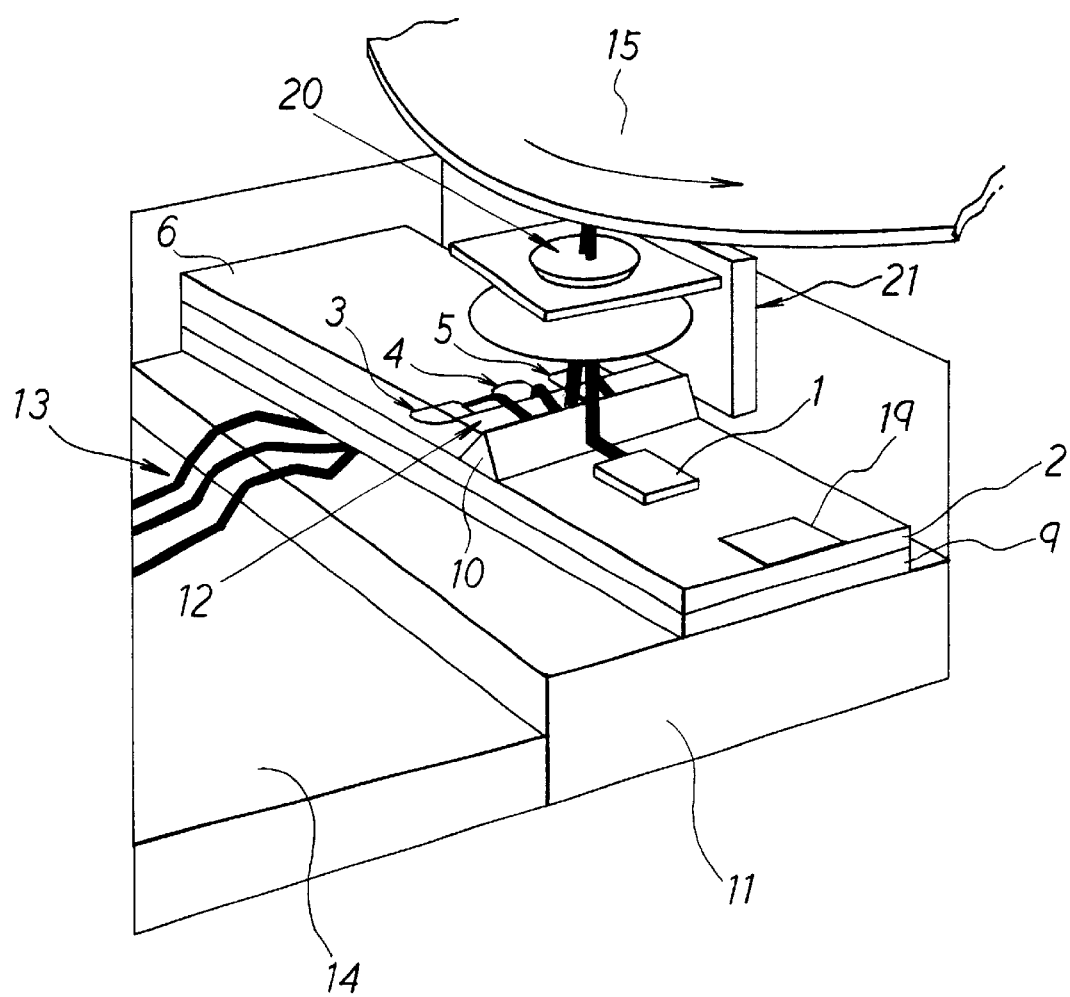
FIG. 17 shows an arrangement further comprising an actuator for vertically moving the hemispherical lens as shown in FIG. 16.
Figure 18:
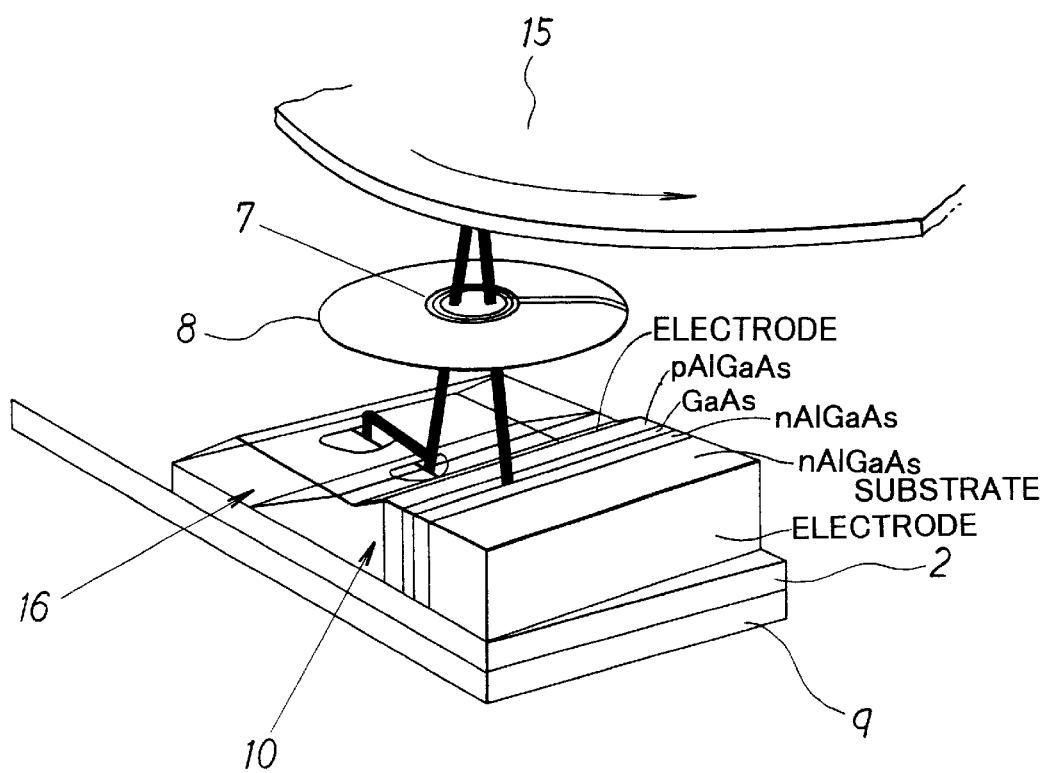
FIG. 18 shows a modified embodiment of the first embodiment, illustrating an optical head having a structure in which a semiconductor laser is vertically placed.

When the hemispherical lens 20 shown in FIG. 16 is used in combination with the objective lens, it is important to effect the positional adjustment for the lens 8 and the hemispherical lens 20. Therefore, it is preferable that a microactuator 21 for vertically moving the hemispherical lens 20 is provided as shown in FIG. 17 to adjust the focal point thereby.

Ninth Embodiment

This embodiment describes an illustrative arrangement of the magneto-optical disk 15 on which recording or reproduction can be performed by using the optical head according to the present invention.

A first nitride dielectric film of about 60 nm, a $Tb_{22}Fe_{68}Co_{10}$ perpendicularly magnetizable film of about 200 nm as a first magnetic layer, a first Al reflective film of 10 nm, a second nitride dielectric of 15 nm, a second magnetic layer of $Gd_{22}Fe_{68}Co_{10}$ of 20 nm, and a third nitride dielectric of about 60 nm are stacked respectively on a polycarbonate substrate having a land and a groove having a width of 0.45 $\mu$m. The groove depth is 45 nm. If the floating amount of the floating head is about 300 nm, the floating stability of the slider is not inhibited, because the difference in height between the land and the groove is about 45 nm.

The disk sample was prepared in accordance with the high frequency sputtering method after being evacuated to a vacuum degree of not more than $3 \times 10^{-7}$ Torr. The sputtering power was 1 kW for each of the layers. As for the target to be used for the sputtering, it is preferable to use a target having a diametral size of not less than 5 inches in order to achieve a uniform film thickness over the entire 5-inch substrate. When the substrate is revolved and rotated, the uniformity of the film thickness is further enhanced. The arrangement of the disk described above is illustrative of a disk arrangement based on the magnetic domain-magnifying reproducing system in which high density minute magnetic domains are recorded on the first magnetic layer which is located at a portion having a most raised temperature in the vicinity of the center of the light spot, and one of the high density minute magnetic domains is magnified and transferred to the second magnetic layer to obtain a large reproduced signal. The magneto-optical disk of this type is disclosed in WO 98/02876 and WO 98/02877 filed by the present applicant. These patent documents are incorporated herein by reference. The Curie temperature of the second magnetic layer $Tb_{22}Fe_{68}Co_{10}$ is about 270° C., and the Curie temperature of the first magnetic layer $Gd_{22}Fe_{68}Co_{10}$ is about 350° C.

When recording and reproducing can be performed by using a small magnetic field, it is possible to increase the data transfer rate. For this purpose, it has been found that the magnetic field necessary for recording is decreased from 200 (Oe) to 100 (Oe) when a $Gd_{22}Fe_{58}Co_{20}$ magnetic film (recording auxiliary layer) is stacked on the first magnetic layer on the side of the substrate. The $Gd_{22}Fe_{58}Co_{20}$ magnetic film exhibits the in-plane magnetization upon recording, and it exhibits perpendicular magnetization upon reproduction. The farther from the recording head the recording auxiliary layer is, the less the effect is. Therefore, it is preferable to arrange the recording auxiliary layer at a position near to the disk surface.

In order to lower the reproducing magnetic field for magnifying and reproducing the magnetic domain, it has been found that the necessary reproducing magnetic field can be lowered from about 200 (Oe) to about 100 (Oe) by smoothing the surface of the second dielectric by means of, for example, the sputtering etching. The sputtering etching is a process in which the polarity of the sputtering electrode is inverted to perform the sputtering for the surface of the recording film having been once applied. Therefore, in this process, the film thickness of the second dielectric film is decreased by the etching, and hence it is necessary that the second dielectric layer is formed beforehand by the sputtering to be excessively thick corresponding to the film thickness to be decreased. In this embodiment, it has been already revealed that the second dielectric is eliminated by about 5 nm by the sputtering etching for about 1 minute. Therefore, the thickness of the second dielectric was set to be 20 nm.

The optical head and the optical apparatus capable of recording and reproducing information according to the present invention have been explained above with reference to the embodiments. However, the present invention is not limited to the embodiments described above, which may be modified and deformed in other various forms.

For example, the embodiments described above have been explained as exemplified by the magneto-optical disk as the information-recording medium. However, it is also possible to perform reproduction on a high density read-only disk (ROM), for example, CD-R or DVD-ROM. When the magneto-optical signal is reproduced, the differential signal between the detectors 3, 5 is utilized. However, in the case of reproduction on ROM, a sum signal obtained for the detectors 3, 5 serves as a reproduced signal. In the case of ROM which does not use the magneto-optical signal, it is possible to arrange the detectors as shown in FIG. 3.

The embodiments described above are illustrative of the case in which the focusing and the tracking servo are performed by using the actuator 9 and the micromirror 38. However, the position of the objective lens 8 may be controlled by using an actuator. Alternatively, the tracking can be controlled even when the arrangement shown in FIG. 4 is rotated by 90 degrees with respect to the disk 15 to change the swinging direction of the reflecting mirror 10a to be in the vertical direction. Further alternatively, the substrate is made movable both vertically and horizontally by using the microactuator 9 installed under the substrate 2 to simultaneously execute both of the focusing servo and the tracking servo.

In another modified embodiment, as shown in FIG. 8, the semiconductor laser 1 may be arranged vertically. In this modified embodiment, it is unnecessary to use the deflecting mirror 10. However, the height of the optical head is high, and it is relatively difficult to perform the positional adjustment.

In the embodiments described above, the lens 8 is used for collecting the light. However, the light can be also collected by using a grating. In this case, although the grating has a low light-collecting ability as compared with the lens, it is possible to increase the head access speed because its weight is light.

In the eighth embodiment, the hemispherical lens is provided between the objective lens and the disk 15. However, the arrangement shown in FIGS. 2 to 4 may further comprise a second objective lens (not shown) provided between the semiconductor laser 1 and the reflecting mirror 10a. The second objective lens may be used to reduce the beam diameter. Accordingly, the objective lens 8 is allowed to have a miniaturized size, and the slider 11 is allowed to have a thinner size.

Further, a voltage may be applied to the yoke shown, for example, in FIGS. 5, 11, and 15 to generate an electric field in the vicinity of the yoke. In this arrangement, the lubricant, the dust, and the dirt, which are peeled off from the disk surface when the floating head slides on the magneto-optical disk, can be attracted to the yoke by the electrostatic attractive force. Accordingly, it is possible to suppress the contamination on the light-radiating surface of the lens.

A head, which has a light weight and a miniaturized size like a magnetic head for the hard disk, can be provided by using the optical head according to the present invention. Accordingly, the transfer rate and the access speed are greatly improved as well. The slider can be made thin as compared with the conventional optical head. Further, the optical head, which is extremely precise and miniaturized, can be produced by means of the semiconductor process by constructing the slider with the semiconductor material. The optical head and the optical apparatus according to the present invention are extremely effective to perform recording and reproducing on the information-recording medium subjected to high density recording, especially the magneto-optical recording medium.

What is claimed is:

1. An optical head used for an apparatus for recording or reproducing information by radiating light onto an information-recording medium, the optical head comprising:
   a laser light source for radiating a laser beam onto the information-recording medium;
   a detector for detecting the laser beam reflected from the information-recording medium; and
   an optical guide unit for introducing, into the detector, the laser beam reflected from the information-recording medium, wherein:
   the laser light source, the detector, and the optical guide unit are formed on a common substrate in a monolithic manner.

2. The optical head according to claim 1, further comprising an objective lens for focusing the laser beam from the laser light source onto the information-recording medium, and a magnetic coil coated on the objective lens.

3. The optical head according to claim 1, wherein the light beam reflected from the information-recording medium is directed in an in-plane direction of the substrate by the optical guide unit.

4. The optical head according to claim 1, wherein the optical guide unit includes a first reflecting mirror and a prism for directing the laser beam reflected from the information-recording medium to the detector.

5. The optical head according to claim 4, wherein the detector includes a plurality of detectors, and the first reflecting mirror has, on a surface of the first reflecting mirror, a diffraction grating for dividing the laser beam into laser beams directed to the respective detectors.

6. The optical head according to claim 4, wherein the optical guide unit further comprises a second reflecting mirror for directing the laser beam from the laser light source to the information-recording medium.

7. The optical head according to claim 6, further comprising a lens arranged between the laser light source and the second reflecting mirror.

8. The optical head according to claim 1, wherein the optical guide unit includes a prism for directing the laser beam reflected from the information-recording medium to the detector.

9. The optical head according to claim 8, wherein the detector includes a plurality of detectors, and the prism divides the laser beam reflected from the information-recording medium into laser beams directed to the respective detectors.

10. The optical head according to claim 1, further comprising a microactuator for adjusting a course of the laser beam to be radiated onto the information-recording medium.

11. The optical head according to claim 1, further comprising a driving circuit for driving the magnetic coil, wherein the driving circuit is formed in a monolithic manner on the substrate.

12. The optical head according to claim 1, wherein the substrate is processed to have a shape of a slider.

13. The optical head according to claim 6, wherein the second reflecting mirror is curved with a predetermined curvature so that a shape of a spot of the laser beam reflected by the second reflecting mirror is shaped to be circular.

14. The optical head according to claim 2, further comprising a yoke coated on an objective lens.

15. An apparatus comprising:
   an optical head as defined in claim 2; and
   an arm for supporting the optical head and moving the optical head with respect to an information-recording medium.

16. The apparatus according to claim 15, further comprising an electric wiring arrangement printed on the arm, for supplying a driving signal or a driving voltage to the optical head.

17. The apparatus according to claim 16, wherein the electric wiring arrangement is printed on the arm by using chromium.

18. An optical head for being used for an apparatus for recording or reproducing information by radiating light onto an information-recording medium, the optical head comprising:
   a laser light source for radiating a laser beam onto the information-recording medium;
   a detector for detecting the laser beam reflected from the information-recording medium;
   an optical guide unit for introducing, into the detector, the laser beam reflected from the information-recording medium; and
   a slider which is floatable over the information-recording medium and has a recess formed on a side of the slider opposing to the information-recording medium, wherein:
   the laser light source, the detector, and the optical guide unit are formed on a bottom of the recess of the slider in a monolithic manner.

19. The optical head according to claim 18, wherein the slider is composed of a semiconductor substrate.

20. The optical head according to claim 18, further comprising an objective lens for focusing the laser beam from the laser light source onto the information-recording medium, and a lens support for supporting the lens over the recess of the slider.

21. The optical head according to claim 20, wherein the objective lens and the lens support are formed integrally.

22. The optical head according to claim 20, further comprising a magnetic coil coated on the objective lens.

23. The optical head according to claim 22, further comprising a yoke coated on the objective lens.

24. The optical head according to claim 18, wherein a layer composed of a material selected from the group consisting of silicone, alumina, and diamond-like carbon is formed on the side of the slider opposing to the information-recording medium.

25. An apparatus for recording or reproducing information on an information-recording medium, comprising the optical head as defined in claim 23, and an arm for supporting the optical head and moving the optical head with respect to the information-recording medium.

26. A magneto-optical head used for an apparatus for recording or reproducing information by radiating light onto an information-recording medium, the magneto-optical head comprising:

a slider floatable over the information-recording medium;

a laser light source provided on the slider, for radiating a laser beam onto the information-recording medium;

a detector provided on the slider, for detecting the laser beam reflected from the information-recording medium;

an objective lens provided on the slider, for focusing the laser beam from the laser light source onto the information-recording medium; and a magnetic member coated on the objective lens and a magnetic coil provided on the objective lens.

27. The magneto-optical head according to claim 26, wherein the objective lens is coated with the magnetic member so that an optical path of the laser beam is comparted thereby.

28. The magneto-optical head according to claim 26, wherein the magnetic member includes, at a light-radiating section of the objective lens, an extending section extending from the lens in a direction of an optical axis of the lens.

29. The magneto-optical head according to claim 26, wherein the magnetic member includes a first extending section extending obliquely with respect to an optical axis of the lens at a light-radiating section of the objective lens, and the magnetic coil is wound around the extending section.

30. The magneto-optical head according to claim 29, wherein the magnetic member further comprises a second extending section provided opposingly to the first extending section with the optical axis of the lens intervening therebetween.

31. The magneto-optical head according to claim 26, further comprising a voltage-applying unit for generating an electric field in the vicinity of a yoke by applying a voltage to the magnetic member.

32. The magneto-optical head according to claim 26, wherein the magnetic coil is wound about a center of an optical axis of the objective lens.

33. The magneto-optical head according to claim 26, further comprising an optical guide unit provided on the slider, for introducing the laser beam into the detector.

34. An apparatus for recording or reproducing information on an information-recording medium, comprising a magneto-optical head as defined in claim 26, and an arm for supporting the magneto-optical head and moving the magneto-optical head with respect to the information-recording medium.

* * * * *